(12) United States Patent
Aaron et al.

(10) Patent No.: US 6,216,486 B1
(45) Date of Patent: Apr. 17, 2001

(54) ICE STORAGE COIL ARRANGEMENT

(75) Inventors: David A. Aaron, Baltimore; Frank T. Morrison, Anne Arundel, both of MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 0 days.

(21) Appl. No.: 09/404,959

(22) Filed: Sep. 24, 1999

(51) Int. Cl.⁷ ..................................................... F25D 3/02
(52) U.S. Cl. .................... 62/434; 62/59; 165/10; 165/163; 165/910
(58) Field of Search ............................... 62/59, 434, 435, 62/430, 398; 165/10, 163, 910

(56) References Cited

U.S. PATENT DOCUMENTS

| | | | |
|---|---|---|---|
| 1,969,187 | * 8/1934 | Schutt | 62/59 |
| 2,056,970 | * 10/1936 | Leopold | 62/59 |
| 2,221,423 | * 11/1940 | Reinhardt | 62/59 |
| 4,044,568 | * 8/1977 | Hagen | 62/59 |
| 4,513,574 | * 4/1985 | Humphreys et al. | 62/59 |
| 5,598,720 | * 2/1997 | MacCracken et al. | 62/59 |
| 5,649,431 | * 7/1997 | Schroeder, Jr. | 62/59 |
| 5,678,626 | * 10/1997 | Gilles | 62/59 |

* cited by examiner

Primary Examiner—William E. Tapolcai
(74) Attorney, Agent, or Firm—Edward J. Brosius; Stephen J. Manich

(57) ABSTRACT

The present invention provides a planned array tubes and circuits in a cooling coil for a thermal storage unit to maintain at least some of the vertical aisles between adjacent circuits or sets of circuits to provide communication through the coil to present more ice-contact surface area to the heat transfer fluid for maintenance of a fluid temperature at about the desired output temperature and to provide a circuit having a means to monitor and control termination of the ice build in a thermal storage unit.

16 Claims, 16 Drawing Sheets

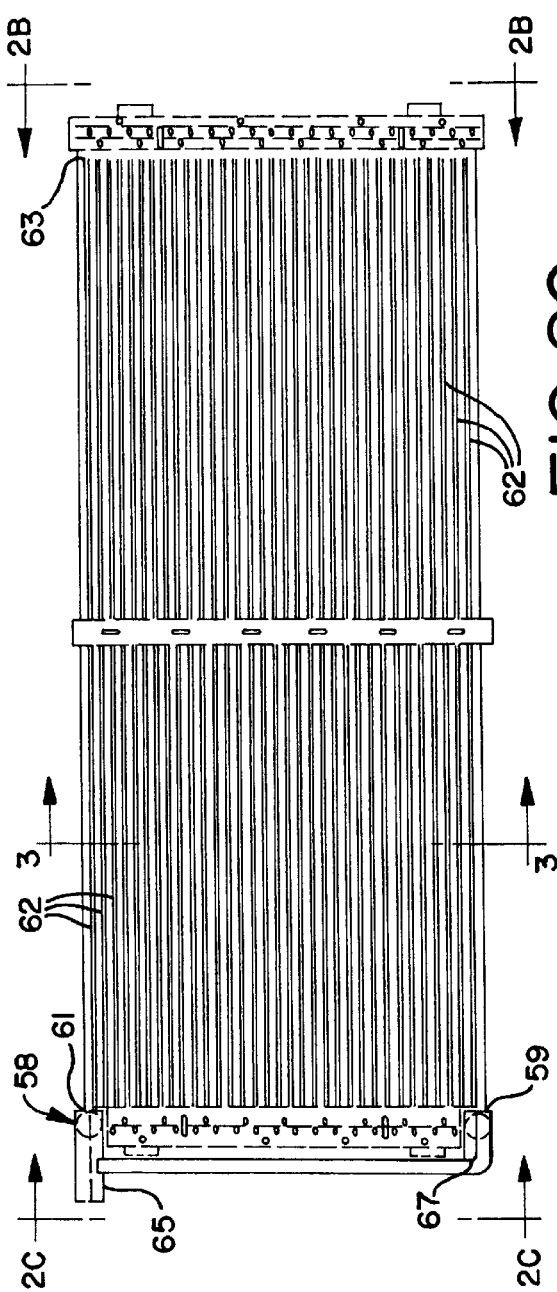
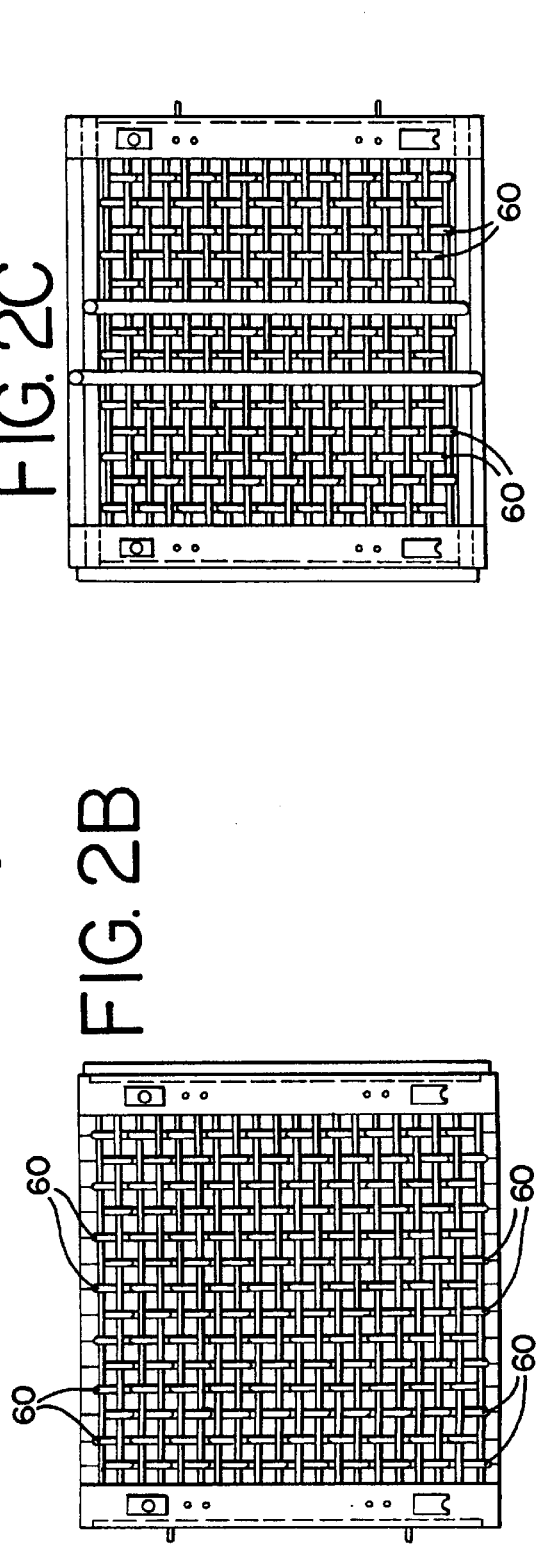

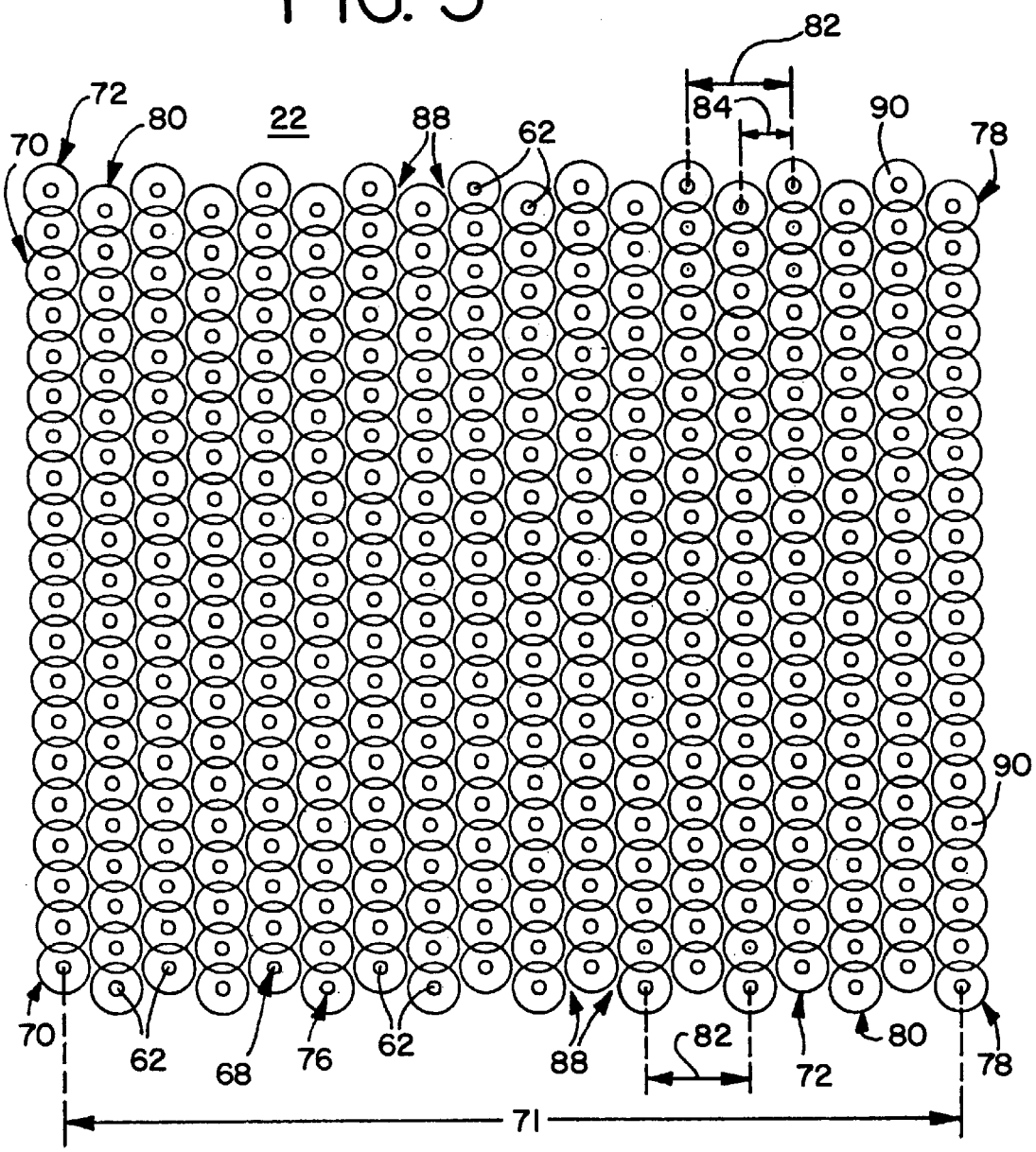

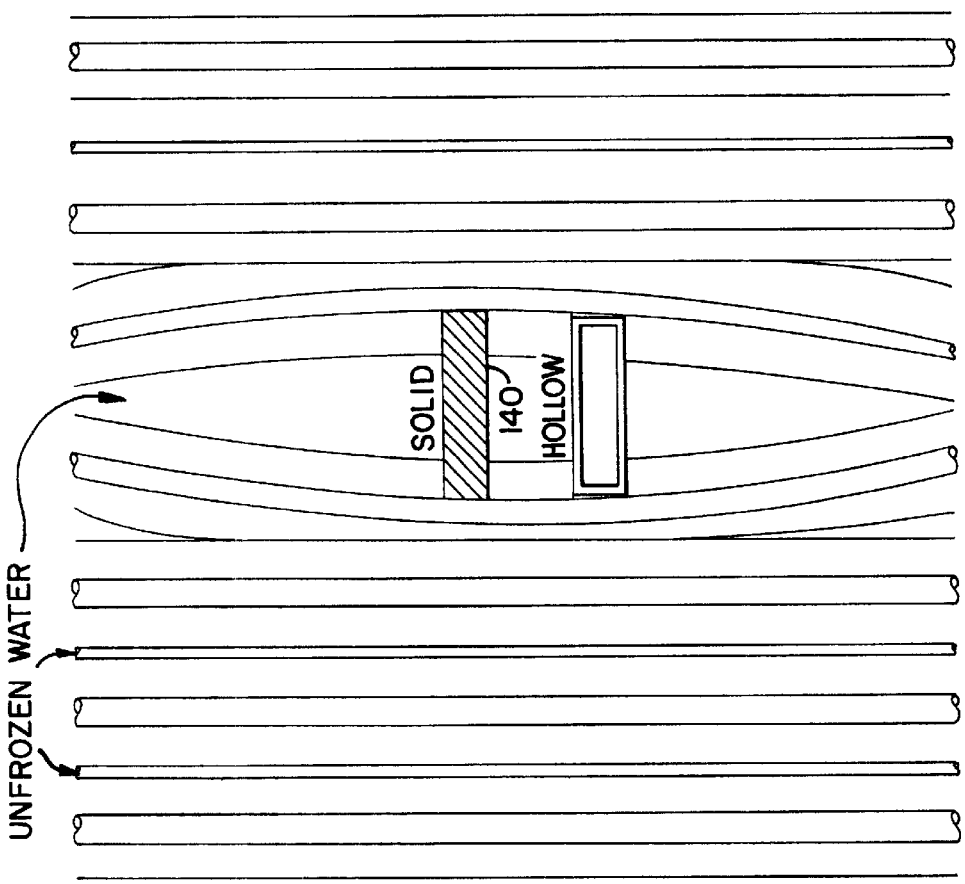
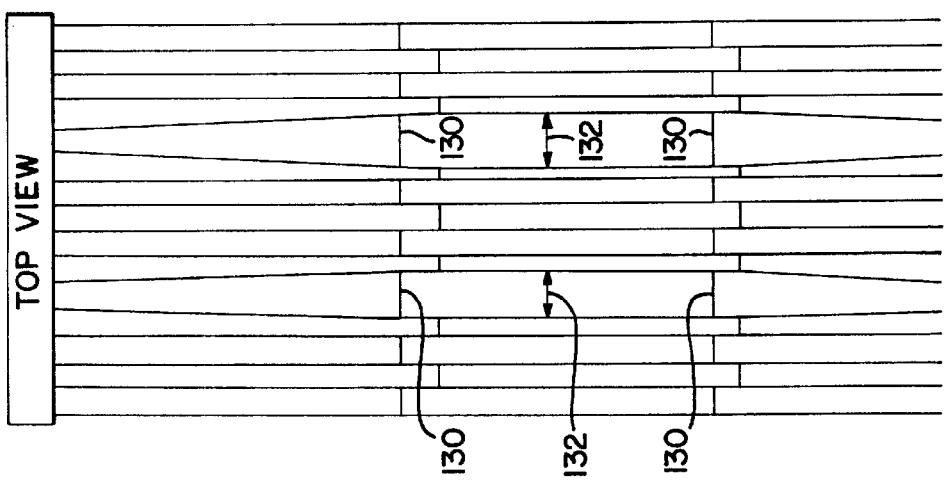

ICE STORAGE COIL ARRANGEMENT

BACKGROUND OF INVENTION

The present invention relates to ice thermal storage units and to the heat exchanger arrangements, such as a cooling coil used to cool and freeze the storage fluid within the storage tank. More specifically, coil arrangements to facilitate ice melting after an overbuild of ice within a thermal storage unit are identified, which arrangement enable maintenance of an adequately low temperature for the thermal storage unit outlet fluid.

Ice thermal storage units provide a means of storing cooling capacity for use at a later time. A frequent application of such thermal-storage equipment utilizes lower cost electrical energy, usually from the evening and night time hours, to generate and store a volume of ice in a large vat or chamber filled with a fluid, such as water. This ice-water mixture is retained until its stored cooling capacity is required, which requirement is usually experienced during high-demand, high-cost periods, such as daytime hours. In a typical operation, the low-temperature fluid is withdrawn from the chamber, pumped through a heat exchanger to absorb heat, and is then returned to the thermal storage unit chamber to be cooled by melting the retained ice. An exemplary application of stored cooling capacity is a district cooling operation, which is becoming a more widely accepted cooling practice in larger communities. These district-cooling operations generally have multiple heat exchangers coupled to a single ice thermal storage facility. The larger number of different users of the thermal storage unit in a district cooling application requires maximum utilization of both physical space and energy.

Unmonitored or improperly controlled ice storage units may overbuild the stored ice. That is, the ice storage chambers most frequently incorporate a plurality of refrigeration coils to cool and freeze the water or other fluid in the chamber. During the storage or build cycle, the fluid is cooled until the ice develops on each tube. As in most coil heat-exchanger arrangements, the tubes are generally separated at an equidistant gap separation both vertically and horizontally.

The above-mentioned separation gap is an operational requirement to provide space between the tubes for ice buildup and to provide a path for fluid flow between the tubes and stored ice sleeves to recapture the stored cooling capacity. However, it is known that the uncontrolled growth of the ice on the tubes or circuits will, or may, result in complete horizontal bridging of the ice formed on the adjacent tubes. Although the total amount of ice stored may be sufficient for the application, the available thermal storage cooling capacity may be inadequate because only the perimeter of the formed monolithic ice block within the thermal storage unit is accessible to contact the circulating coolant, such as water resulting in higher leaving temperatures.

As a method to enhance recovery of the stored energy or cooling capacity, air agitation is typically provided at the bottom of the ice-storage chamber. This air travels upward through the gaps between adjacent tubes and ice masses. However, the development of monolithic or solid ice masses removes the separation gaps between adjacent tubes and the ice thereon, which inhibits air flow and fluid flow through the ice mass. The resultant effect is the reduction of the cooling capacity recovery as it is limited to the outer surfaces of the ice mass, which produces cooling fluid at higher and less useable temperatures. Attempts to improve efficiency at times utilizes extreme measures to melt the ice mass, such as using-high pressure hoses to melt the ice.

Although there are some monitoring techniques and equipment available to measure the volume of ice developed in a given chamber, it is a more general practice to visually inspect the tank volume. Another method utilizes a fluid level monitor based on the change of volume for ice, but these devices are not relied upon especially for shallow-volume tanks involving very small fluid-height changes. Therefore, overbuild ice conditions with monolithic ice blocks are a common and recurrent condition.

Consequently, it is desired to provide a means or method for greater access to more of the stored ice surface than just the outer perimeter of a monolithic ice block when an overbuild occurs.

SUMMARY OF THE INVENTION

The present invention provides a cooling coil arrangement that uses a variable gap distance alignment, which incorporates the use of at least one aeration or fluid-flow channel within the coil array with a greater separation gap between adjacent tubes than the remaining tube separation gaps. Further, it has also been noted that with a small increase in array width, that is about a three percent increase, alternative arrangements it can be provided to accommodate aeration separation gaps. The change in the temperature of refrigerant fluid in the discharge port or the change in the inlet suction pressure at its port to the cooling coils is indicative of the ice build up cycle, or excess build up of ice, above about ten percent beyond full capacity. The sensed temperature change may be coupled to a central processing unit or other control device, which controls the refrigeration-cooling unit, to indicate shutdown of such unit and thus a saving of excess expenditures for unwanted ice buildup and to insure adequate retention of gaps or spaces between at least the vertically adjacent coil arrays.

DRAWINGS

In the several figures of the Drawing, like numbers refer to like elements, and in the figures:

FIG. 2A is a side elevational view of a tube bundle in a storage tank as in FIG. 2;

FIG. 2B is an end view taken along line 2B—2B of the tube bundle in FIG. 2A;

FIG. 2C is an end view taken along line 2C—2C of the tube bundle in FIG. 2A;

FIG. 3 is a cross-sectional view of an exemplary prior art schematic arrangement of the coils of a coil structure in FIG. 2A taken along the line 3—3 with a desired, or 100%, ice build-up on the coils;

Figure 4:
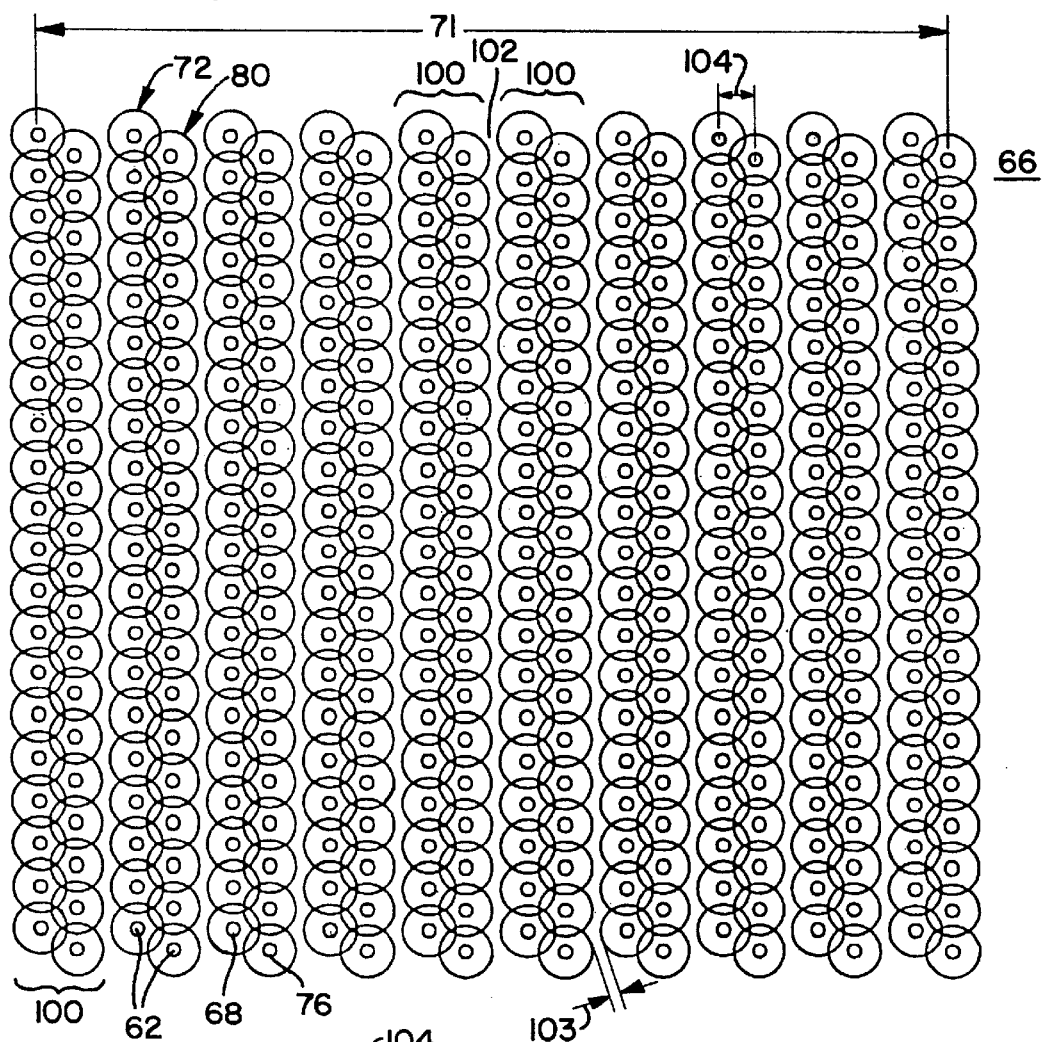
FIG. 4 is a first exemplary embodiment in a cross-sectional view of a coil arrangement with a greater number of individual tubes in a paired coil arrangement with adjacent tubes closely aligned and having a first separation gap, but alternating pairs of coils have a second and larger separation gap between adjacent pairs of coils.
Figure 10:
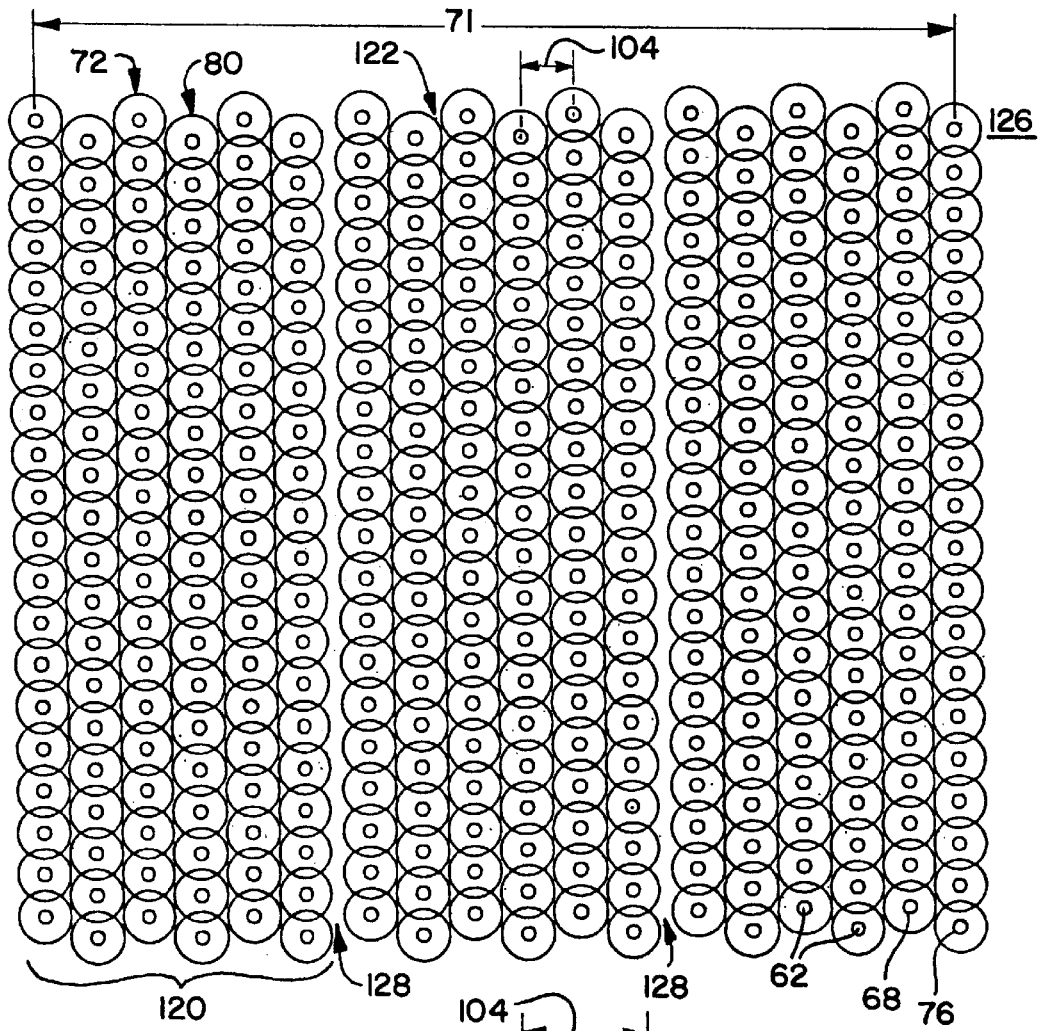
Figure 10A:
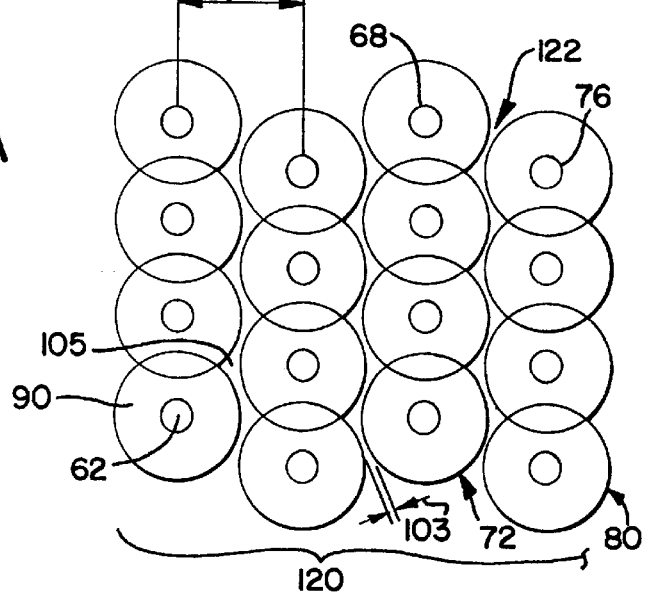
Figure 11:
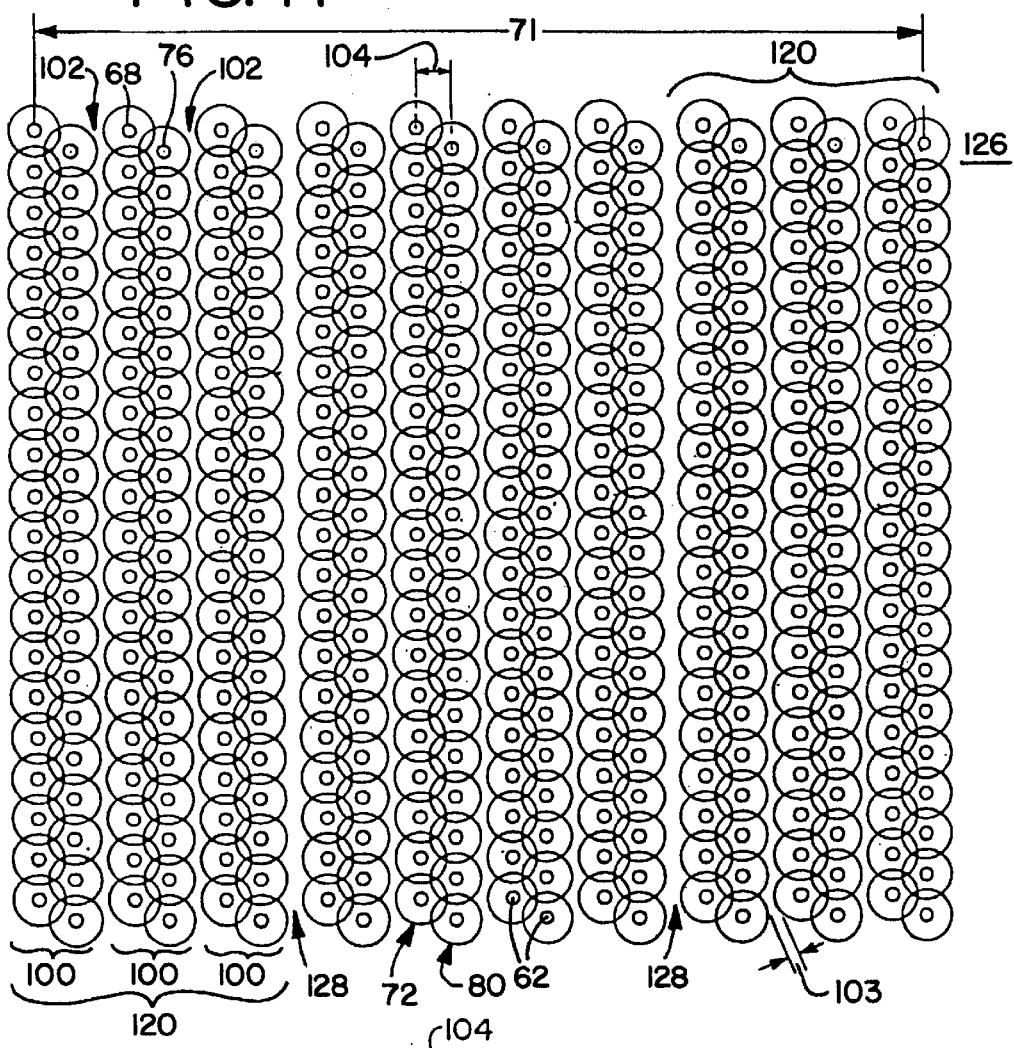

FIG. 10 illustrates another embodiment of the present invention wherein a plurality of adjacent tubes of FIG. 4 are agglomerated to provide a set of coils with a significantly widened first separation gap, the second separation gap between adjacent sets of the agglomerated coils is measurably greater than the gap width of FIG. 4 and there are at least three sets of coils and two large second separation gaps;

FIG. 10A is an enlarged 4×4 section of the coil and ice build-up structure in FIG. 10, but does not include the enlarged center separation gap;

FIG. 11 illustrates the general structure of FIG. 4 with second separation gap again noted between adjacent pairs and a plurality of pairs agglomerated to provide the set structure of FIG. 10 and including the enlarged separation gap between adjacent sets of the agglomerated pairs of coils or tubes.

Figure 11A:
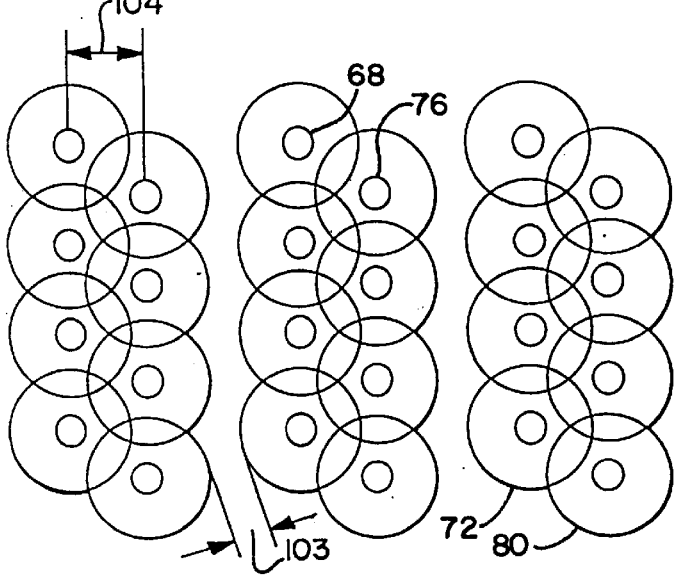
Figure 12:
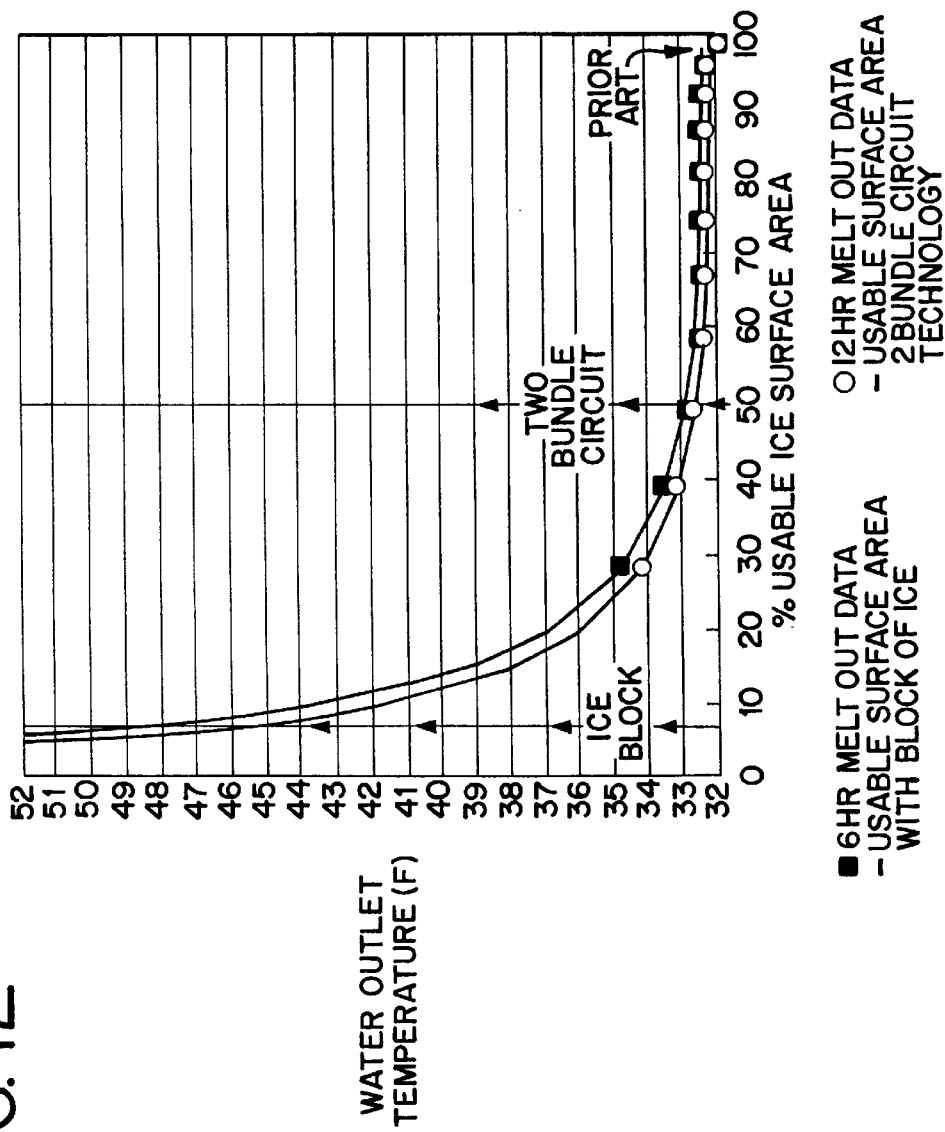
Figure 13:
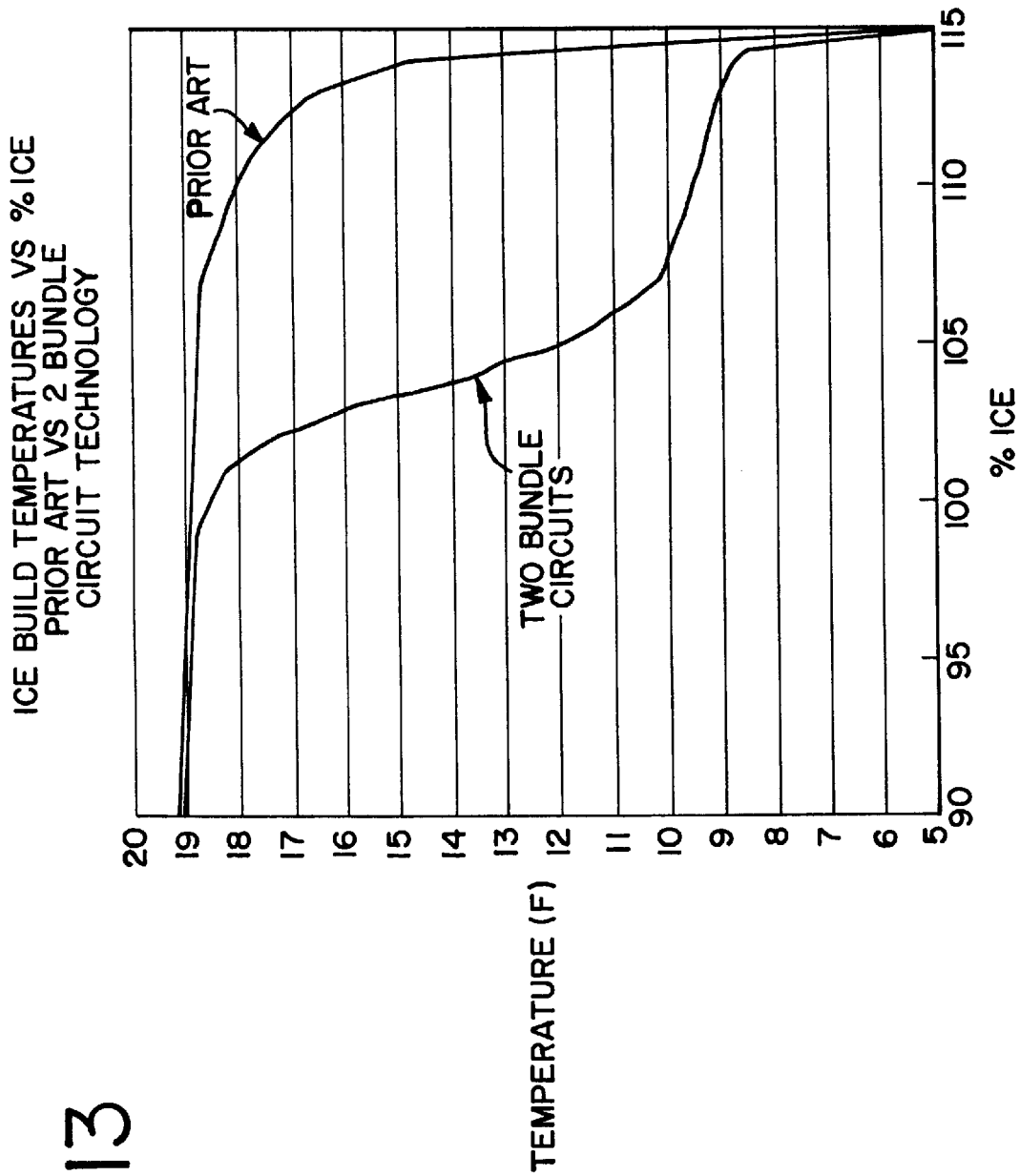

FIG. 11A is an enlarged 4×6 section of the coil and ice build-up structure in FIG. 11, but does not include the enlarged separation gaps or aisles;

FIG. 12 is an graphical illustrations of outlet temperature versus the percentage of usable ice surface area;

FIG. 13 is a graphical illustration of outlet temperature versus the percentage of usable ice surface area;

FIG. 14 is a plan view of an ice tube array mechanical separators to provide an enlarged separation gap; and, FIG. 15 illustrates alternative embodiments to provide mechanical separation between adjacent tubes.

DETAILED DESCRIPTION OF THE DISCLOSURE

Figure 1:
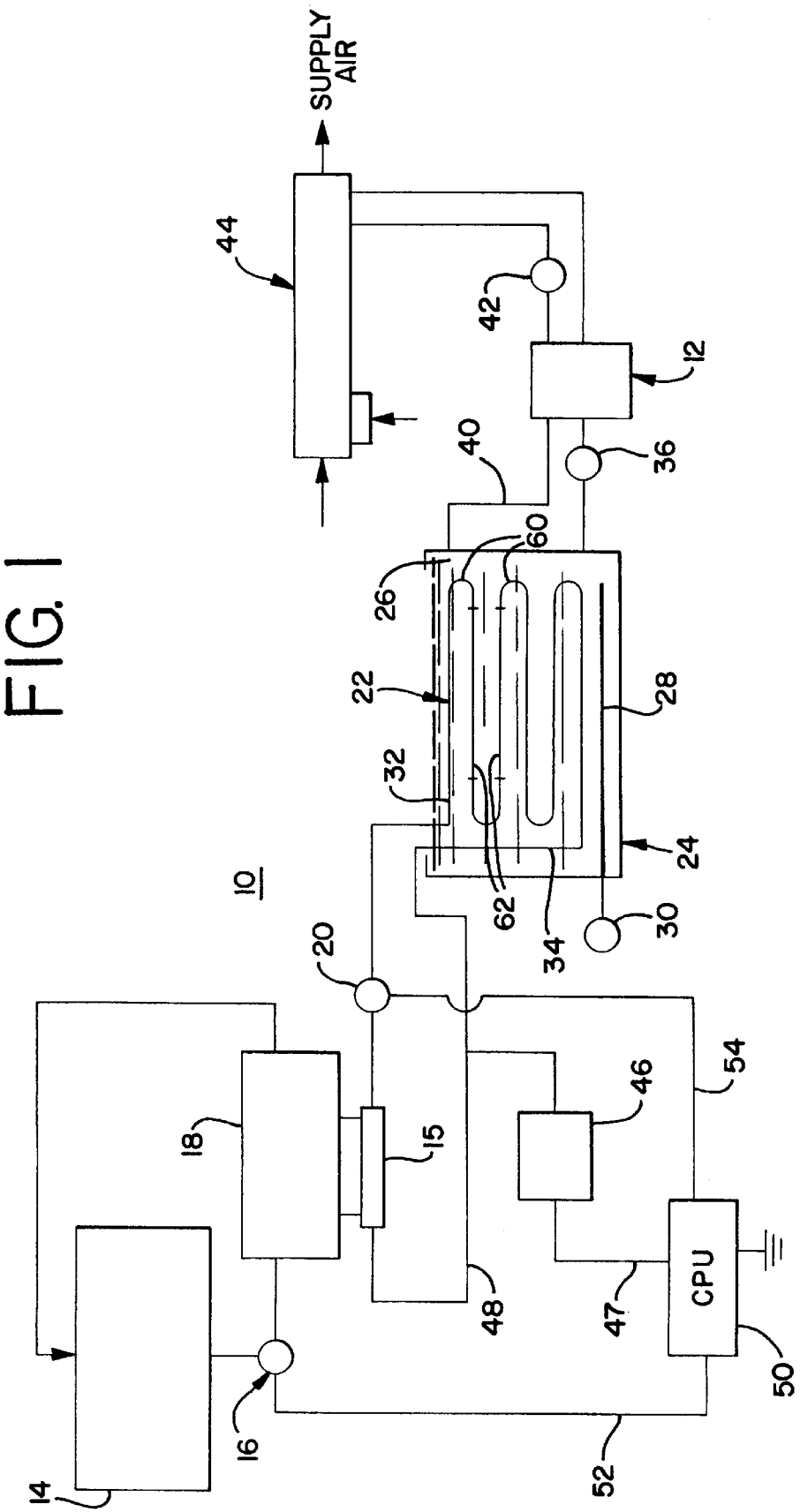
FIG. 1 is a schematic illustration of typical thermal storage application.

FIG. 1 is an illustrative schematic of a thermal storage apparatus 10 coupled to an external heat exchanger 12. Apparatus 10 has cooling tower 14 coupled to condenser and water pump 16. Glycol chiller 18 with barrel 15 and pump 20 is connected to cooling coil arrangement 22 in thermal storage tank 24, which has water as at storage fluid in tank chamber 26. Aeration line 28 at tank bottom 30 provides aeration and agitation of the fluid in tank 24. Coil 22 is connected at inlet 32, for input of refrigeration fluid and outlet 34 for discharge or return of warm refrigerant to glycol chiller 18, which may include a compressor. The specific refrigerant and refrigeration unit or chiller 18 is not limited respectively to glycol or the illustrated structure, but is a design choice. Chiller 18 provides cold glycol through barrel 15, which glycol is pumped to tube array 22 to chill or freeze thermal storage fluid in tank 24.

Ice-water pump 36 in this example is coupled between heat exchanger 12 and tank chamber 26 for transfer of cooled fluid to exchanger 12 and return of fluid to tank chamber 26 by line 40. In an exemplary application, chilled water pump 42 communicates a cooled fluid from exchanger 12 to air handling apparatus 44.

FIG. 1 includes temperature-pressure sensor 46 connected to refrigerant return line 48 downstream of discharge outlet 34 to monitor the temperature and pressure of discharge refrigerant. In this illustration, sensor 46 is coupled by line 47 to control CPU 50, which is coupled to pump 16 by line 52 and pump 20 by line 54, to start or stop operation of pump 16 and pump 20, and to initiate or stop ice buildup in tank 24. This illustration and use of CPU 50 as a control device is merely exemplary and is not a limitation to the present invention.

Figure 2:
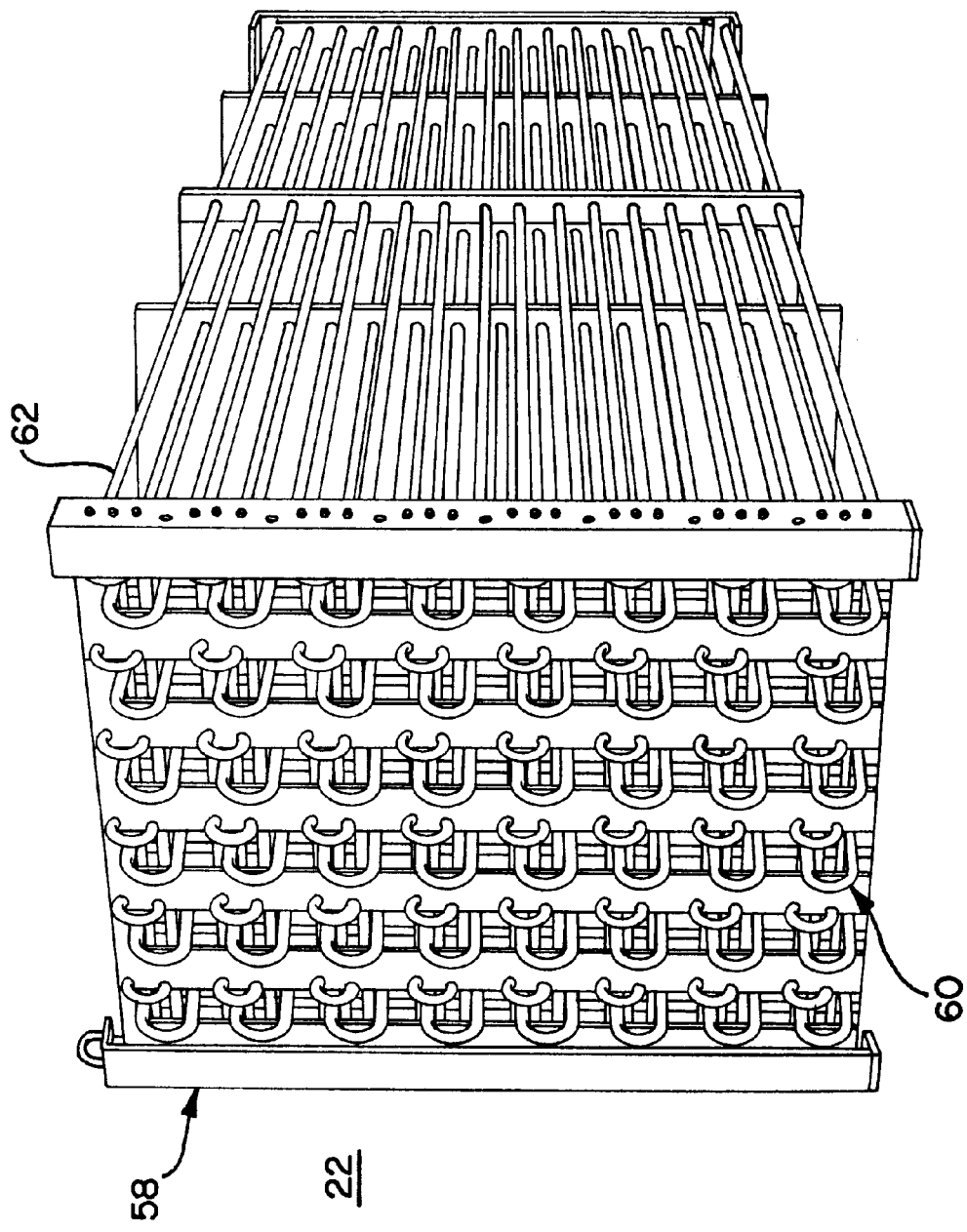
FIG. 2 is an oblique end view of a typical coil structure with the looped header ends and piping extending between the ends.
Figure 3A:
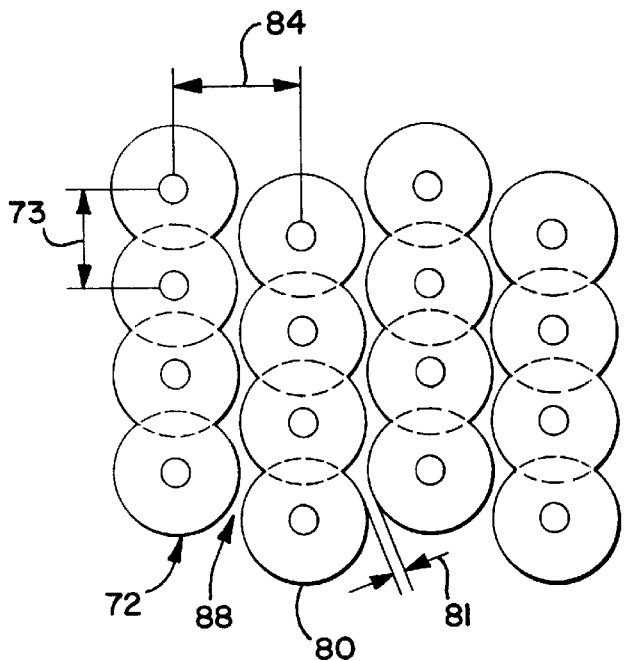
FIG. 3A is an enlarged 4×4 section of the coil and ice build-up structure in FIG. 3.
Figure 3B:
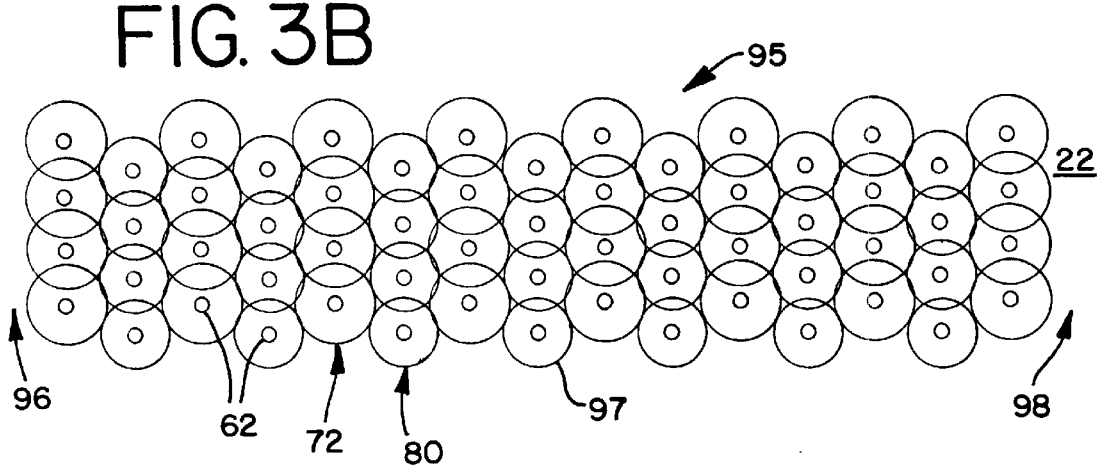
FIG. 3B is segmented view of the coil structure in FIG. 3 with approximately a ten percent excess ice build-up on the coil structure, as an illustration.
Figure 3C:
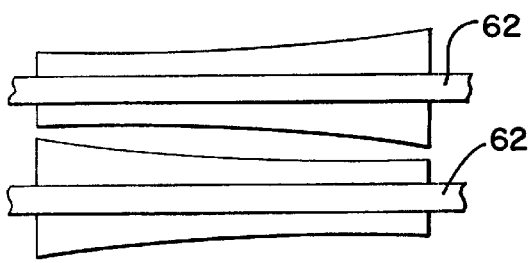
FIG. 3C illustrates a desired or typical ice build-up on tubes in a coil structure.

Coil arrangement 22 in FIG. 2 is shown in an oblique end view with upper header 58 and elbows 60 joining ends 61 or 63 of tubes 62, as more easily noted in FIG. 2A. Header 58 has inlet port 65 and discharge port 67, which ports 65 and 67 are connected to chiller 18 and pump 20 by lines 48. Upper header 58 and lower header 59 in FIGS. 2A and 2C are illustrative of a coil arrangement 22 specifically utilized for the below-described coil-feed structure with every other circuit for alternate circuits fed with glycol from the top and bottom header to more efficiently pack ice in tank 24 as noted in FIG. 3C. The specific arrangement in FIGS. 2, 2A, 2B, 2C, 3, 3A, 3B and 3C is an exemplary description and not a limitation. In FIG. 3, vertical bridging between vertically adjacent tubes 62 is a known and accepted practice, whereas horizontal bridging between adjacent vertical circuits 68 and 76 is an undesirable condition in this structure.

The use of thermal storage units 10 is known in the art. Units 10 are utilized frequently to provide on-demand cooling capacity for high-demand periods of time. The stored cooling capacity or thermal storage capacity is generated or accumulated in off-peak periods of demand time, usually in the overnight hours, by regeneration of ice or other phase-change thermal storage fluid. The stored cooling capacity is typically recovered by withdrawal of the fluid from chamber 26 of tank 24 and transferring it through a heat exchanger 12 or other end-use device 44.

A recurrent problem or concern for the user and designer of thermal storage unit 10 is the temperature of the withdrawn coolant fluid. This fluid temperature at ice-water pump 36 is typically desired to be at or below 34° F. to maximize the coolant effect upon end use apparatus 44. After cycling the thermal storage fluid from chamber 26 through apparatus 44 or heat exchanger 12 the thermal storage fluid is returned to chamber 26 to be chilled to 34° F. for reuse in apparatus 44 or heat exchanger 12. However, it is known that the rate of chilling of the recycled fluid is dependent upon the available stored ice mass and its available contact surface area. Therefore, in chamber 26 coil arrangement 22 is designed with a design full or maximum capacity to accommodate fluid flow between adjacent tubes 62. Preferably the available ice contact surface area provides more exposed ice contact surface area than just the outside surfaces of a monolithic block of ice at an ice overbuild condition in chamber 26. Tubes 62 are noted in the figures as round cross-sections, but the description is applicable to various tube cross-sections and thus the tube shape is not a limitation. Further, the tube shape could be provided in plates or plate forms, as known in the art of heat exchangers.

The amount of surface area is dependent upon the amount of solidification of the thermal storage fluid on tubes 62 in chamber 26, which may include ice bridging between vertically or horizontally adjacent tubes 62. Although it is desirable to maintain separation between ice masses 90 on tubes 62 in all directions, it is known that through the use of aerators 28 or other apparatus vertical fluid flow can be accommodated to provide fluid temperature reduction in chamber 26. Therefore, it is generally considered more critical to maintain the vertical channels or aisles between horizontally adjacent tubes 62 as a means to maintain fluid flow reduced temperature fluid in chamber 26. Maintenance of these vertical channels will provide adequate ice-contact surface area even after ice bridging between vertically adjacent tubes 62.

Although the amount of ice-contact surface area is dependent upon the amount of solidification and its structural impact on the noted channels, the rate of thermal energy withdrawal will impact the overall capacity of thermal storage unit 10 in terms of the ice melt times. These rate effects are known in the art but are not a part of the present invention except as a natural consequence of the resultant structures. However, the desired thermal-storage fluid outlet temperature of approximately 34° F. is a desired temperature in many applications.

FIG. 3 illustrates a typical representative cross-sectional outline of coil arrangement 22 illustrated in FIG. 2. Coil arrangement 22 has a plurality of tubes 62, which are generally parallel within arrangement 22, but alternative configurations may be utilized. Tubes 62 of circuits 68 and 76 in FIGS. 4 to 11 are part of a circuit-feed structure, which was noted above, providing refrigerant fluid to adjacent tubes 62 in opposite directions from refrigeration devices such as chiller 18. The resultant ice of solidified thermal storage fluid buildup on tubes 62 is illustrated in FIG. 3C. This concept of build up from opposite directions or tube ends provides a more uniform ice mass on tubes 62 to maximize the use the of volume of chamber 26, and this technique is known in the art. Similarly, the use of a circuit-feed arrangement is known and shown in FIG. 3 along with the use of headers 58 and 59 to retain tubes 62 and to transfer refrigerant fluid from chiller 18 or other refrigerant apparatus.

As noted above, FIG. 3 illustrates the ordered arrangement or array 22 of tubes 62 in chamber 26. A cross-sectional view of array 22 from known assemblies provides tubes 62 in a uniform arrangement. Typically, first circuits 68 and second circuits 76 of this arrangement 22 provide a series of rows 70 and columns 72 with uniform separation gap 84 between adjacent row and column tube centers. In FIG. 3A, horizontal separation gap 84 between tube centers of adjacent tube columns 68 and 76 is substantially uniform across width 71 of arrangement 22.

In FIG. 3A, it is noted that vertical separation gap or distance 73 is less than horizontal gap 84. In this reference or prior art figure, tube array 22 is noted with uniform ice formations 90, but in the vertical direction of columns 72 and 80 the solidified masses between adjacent tubes 62 have merged or bridged gap 73. Vertical corridor or aisle 88 between vertically adjacent columns 72 and 80 across the array width 71 remain open for fluid flow in this aisle 88. The width between ice formations 90 or tubes 62 is noted as gap 81 in FIG. 3A.

The above-ice-build configuration is a desired or design characteristic for ice build-up at one hundred percent or full-capacity ice growth. Thereafter, the thermal storage unit 10 and specifically ice chiller 18 should cease the solidification-regeneration process. However, it is known that continued ice will develop on tubes 62 as long as chiller 18 continues to operate. Such continued ice growth will be at a slower growth rate and may attain complete bridging across aisles 88 to form what is referred to as a monolithic is mass, as shown in FIG. 3B. This ice-bridging reduces or eliminates all flow between adjacent tubes 62 in array 22 and thermal-storage fluid within chamber 26 primarily flows along and around the perimeter of coil array 22 such as at side walls 96 and 98, top 95, bottom 97 and the end walls not shown. This minimizes the ability of the fluid to flow through array 22 and effectively reduces the rate of heat transfer to the thermal-storage fluid being transferred by ice-pump 36 to apparatus 44 or heat exchanger 12, as the ice-contact surface area has been dramatically reduced from the design characteristics. As a consequence of the heat-transfer rate, the temperature of the thermal-storage fluid communicating to apparatus 44 increases. The elevated temperature fluid reduces the efficiency of heat exchanger 12 or apparatus 44, which may require utilization of supplemental cooling devices or other accommodation to achieve desired operating performance from such devices. Thus, it is desired to maintain at least some of aisles 88 open to fluid passage to maintain more usable ice-contact surface area to achieve and maintain lower thermal storage fluid temperatures, as illustrated in FIG. 12. More specifically, it is desired to maintain at least some of the design full-capacity surface area available for contact with thermal storage fluid after the as-designed maximum or full-capacity ice build-up has been attained. As noted above, the generally utilized methods of monitoring ice buildup to avoid bridging of aisles 88 have included visual inspection or measurement of the fluid level in tank chamber 26 or ice thickness controls.

The present invention provides ice build-up in chamber 26 with a tolerance for an overbuild condition that will maintain fluid flow in at least some of aisles 88. Specifically, aisles 88 are maintained open between at least some of the generally vertical circuits 68 and 76, which aisles 88 in FIG. 3 will maintain the desired approximately thirty percent of exposed ice surface contact area for maintenance of the desired heat transfer to the flowing thermal-storage fluid.

Figure 4A:
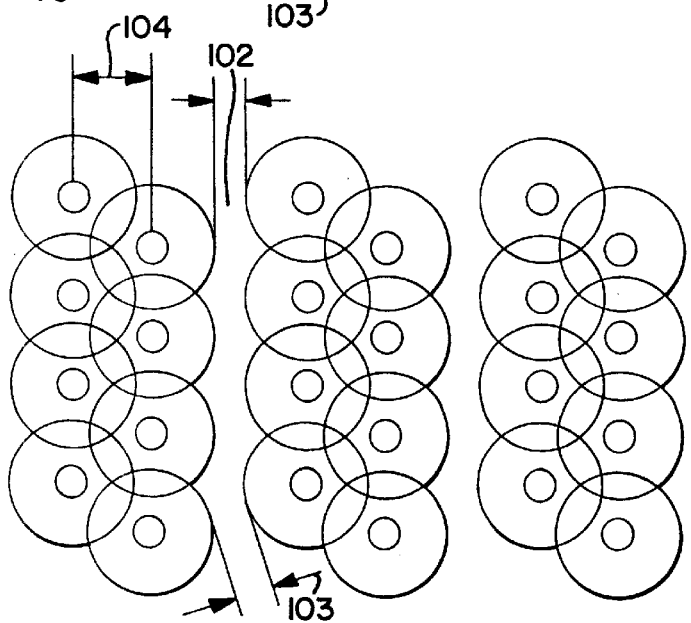
FIG. 4A is an enlarged 4×6 section of the coil and ice build-up structure in FIG. 4.

In FIGS. 4 and 4A, first circuit 68 and second circuit 76 with tubes 62 are again provided as components of array 66 in this first illustrative embodiment of the present invention, which appears with the same general configuration of above-noted array 22. In this configuration, adjacent first circuit 68 and second circuit 76 pairs or circuit sets 100 are closely aligned in vertical columns 72 and 80 with first separation gap 104 between the adjacent pairs of tubes 62 in columns 72 and 80 being less than uniform first separation gap 84 of prior art array 22 in FIG. 3.

In this embodiment of FIG. 4, adjacent pairs 100 of circuits 68 and 76 are separated by aisles or corridors 102, which are wider than first aisles 88 of prior art array 22. In an exemplary arrangement, separation gap 104 was reduced in width from first separation gap 84 by approximately thirty percent. However, the width 81 of aisles 88 was more than doubled in length to width 103 to provide aisles 102 between adjacent circuit pairs 100.

As noted in FIGS. 4 and 4A, the concentric ice build up will bridge the vertical and horizontal separation distance 84 between adjacent tubes 62 in each pair set 100 at maximum or full-capacity ice build up. However, aisle 102 will remain open with over twice the width of above-noted aisle 88.

Ordered array 66 maintains aisle 102 open to fluid flow, and consequently to air flow from aerator 28, even at an overbuild condition. In operation, as ice is developed on tubes 62 the ice provides an insulating effect on tubes 62, which reduces the cooling rate of thermal storage fluid by refrigerant from chiller 18. Thus, the ice build up rate is reduced and the effect on the chiller compressor is noted as reduction in suction pressure and refrigerant temperature at chiller 18 as well as a reduction in glycol temperature at chiller 18. These parameters are correlative to a design full-capacity ice build up as a measure of desired ice build up. However, continued operation of chiller 18 will result in continued build up on tubes 62 and circuit pairs 100. As width 103 of aisle 102 is now twice the prior art width and the rate of ice build up has been reduced, aisle 102 will remain open to fluid flow even in an ice over build state, although, width 81 of aisle 88 will decrease in length. Maintenance of open aisle 102 will maintain the desired temperatures of a higher amount of ice-surface contact area for heat transfer from recycled thermal-storage fluid.

Figure 5:
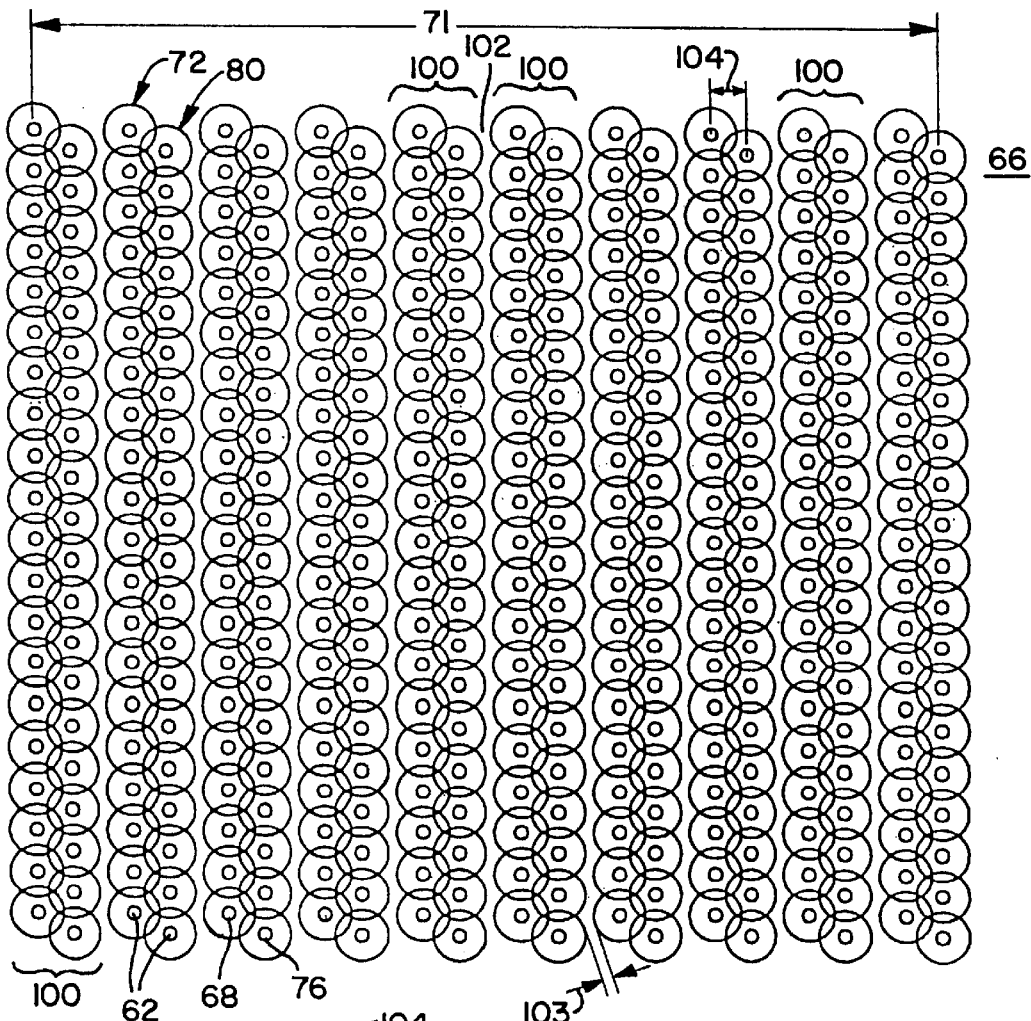
FIG. 5 illustrates another exemplary embodiment of the structure in FIG. 4 with a more narrow first gap and a wider second gap.
Figure 5A:
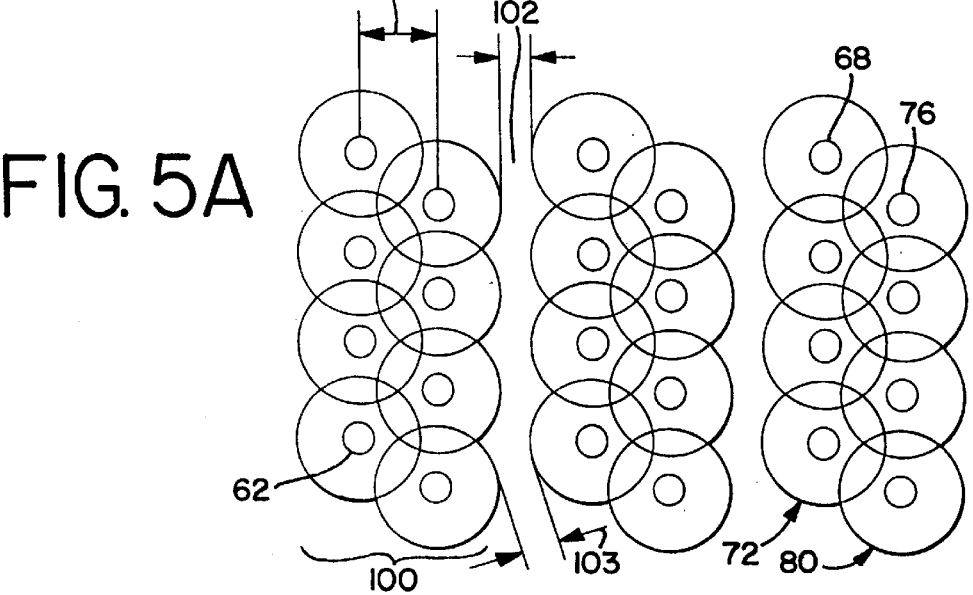
FIG. 5A is an enlarged 4×6 section of the coil and ice build-up structure in FIG. 5.

FIGS. 5 and 5A illustrate an alternative embodiment of the structure of FIG. 4. In this embodiment, tubes 62 of adjacent columns 72 and 80 have been nominally provided more closely aligned to each other, that is the aisle width 104 was reduced by about seven percent less than the width in FIG. 4, as an example. The effect has provided an approximate increase in width 103 and the size of aisle 102 of about fifteen percent, which further enhances the ability of array 66 to maintain sufficient ice-contact surface area. This also inhibits ice build up bridging across aisle 102 at ice overbuild conditions.

Figure 6:
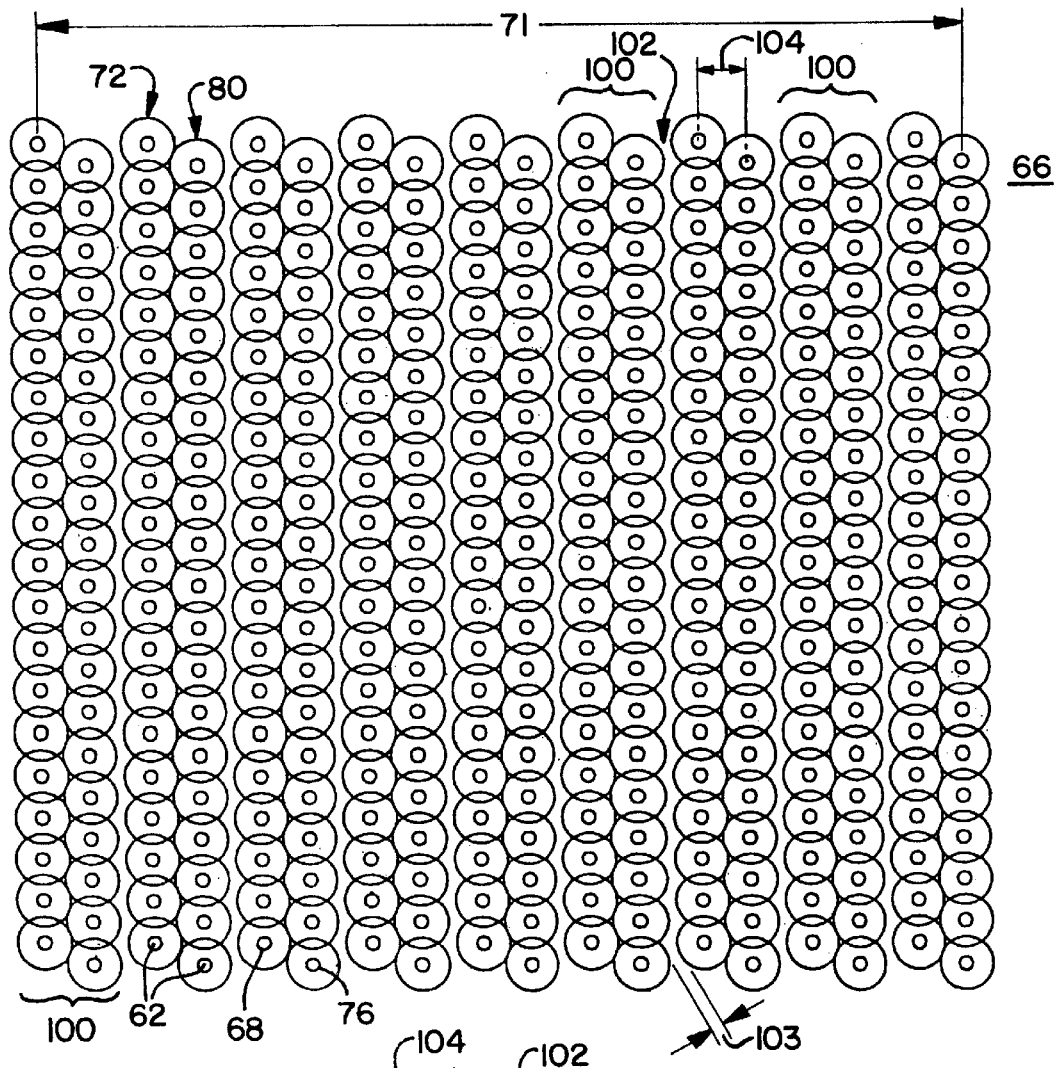
FIG. 6 illustrates a second alternative embodiment of the structure in FIG. 4 with a wider first separation gap and a more narrow second separation gap
Figure 6A:
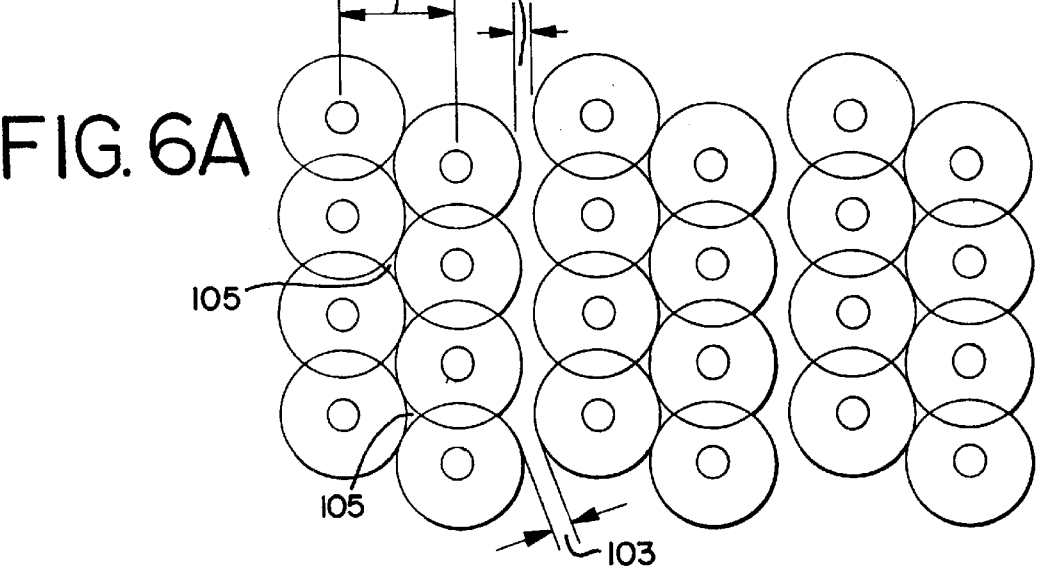
FIG. 6A is an enlarged 4×6 section of the coil and ice build-up structure in FIG. 6.

FIGS. 6 and 6A demonstrate another alternative embodiment to the structure of FIGS. 4 and 4A. The coil structure 22 in FIG. 6 has one-half of the number of vertical aisles 102 noted in the structure of FIG. 3, which permits more pounds of ice per cubic foot in tank 24, which is commonly referred to as ice-packing efficiency, and also should allow a lower amount of air required for agitation by a reduction of as much as fifty percent from previous structures. In these illustrations, separation gap 104 between adjacent tubes 62 in columns 68 and 76 are laterally displaced by about thirty percent more than the tubes in FIG. 4. Aisle 102 and width 103 are consequently reduced in width by approximately fifteen percent, but aisle 102 is maintained in an open condition even in an overbuilt state. Further, the increased width 104 requires more energy to provide the ice bridging and it can potentially incorporate voids 105 at the design full-capacity. Voids 105 may open aisles 104 for fluid flow after ice melt out during fluid flow to apparatus 44 or other demands on the stored thermal capacity. In this illustration, it can be appreciated that as soon as ice cylinders 90 or adjacent tubes 62 touch or bridge, the heat transfer surface area of the ice is decrease by one-half. During ice build up on tubes 62, the growth of the cross-sectional diameter of the ice increases the insulation factor of the ice relative to the heat transfer capability between the refrigerant in tubes 62 from chiller 18 and the thermal storage fluid in chamber 26. Consequently, the rate of growth of ice on tubes 62 is significantly and rapidly reduced, as shown in FIG. 13. The effect on the chiller is a rapid decline in capacity, suction pressure and temperature, as well as glycol temperature. These rapid declines can be monitored to note the end of ice-build cycles.

Figure 7:
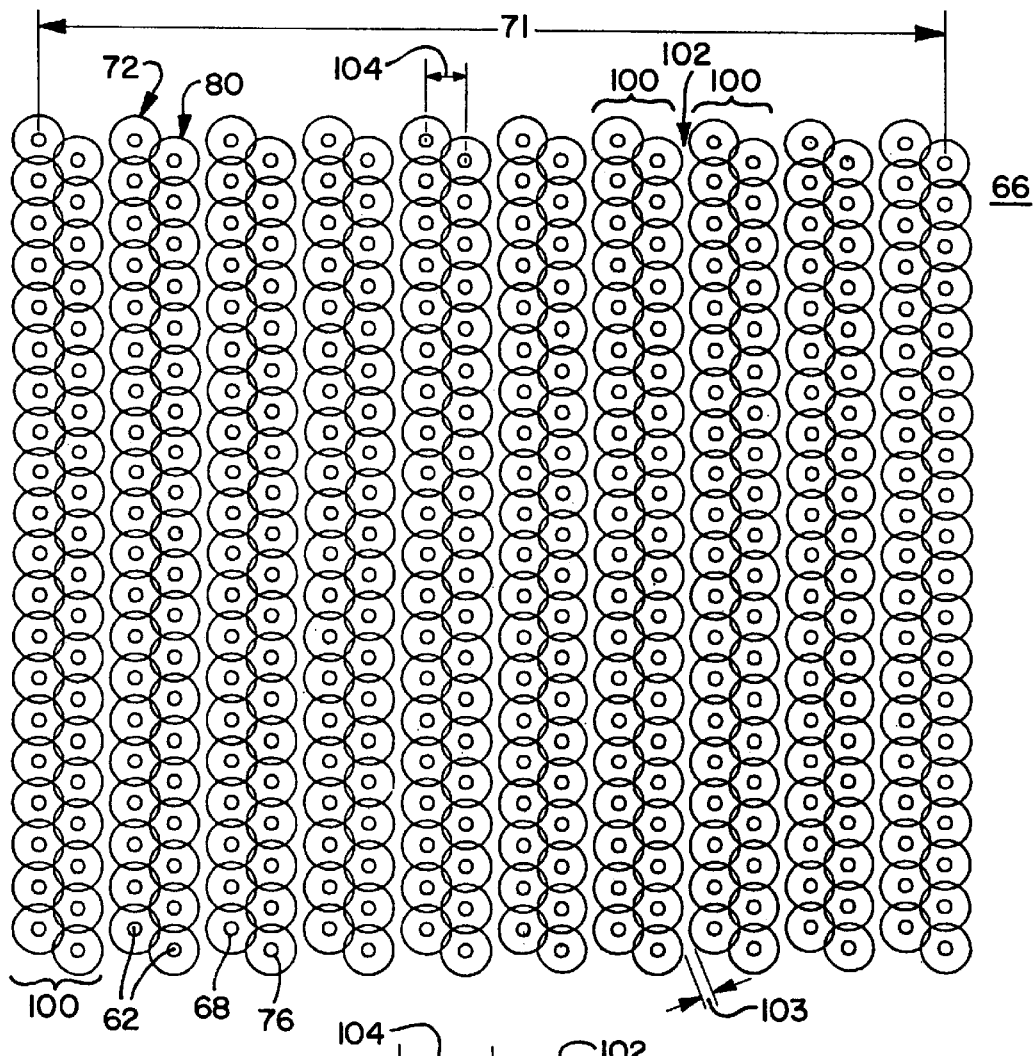
FIG. 7 is an alternative embodiment of the structure in FIG. 4 where the first separation gap between adjacent tubes is incrementally greater, and the second separation gap is nominally more narrow.
Figure 7A:
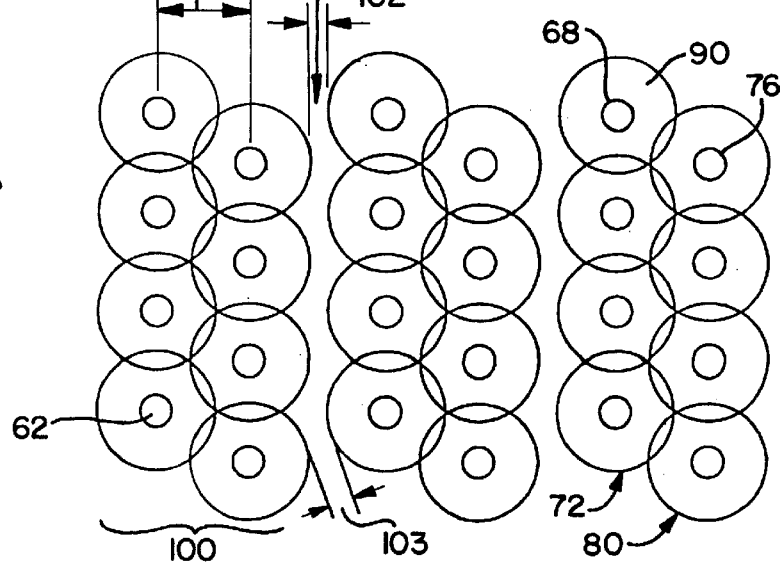
FIG. 7A is an enlarged 4×6 section of the coil and ice build-up structure in FIG. 7.

FIGS. 7 and 7A illustrate another example of variation in width of aisle 104 between adjacent tubes 62 of coils 68 and 76. In these figures, aisle width 104 is about seven percent wider than the width between tubes 62 in FIGS. 4 and 4A. This results in a narrowing of aisles 102 and width 103 by about four percent, but this reordering reduces the overbuild or bridging rate between adjacent tubes 62 in each pair 100. The structure will continue to maintain the thirty percent minimum desired heat-transfer surface area.

Although the above-noted embodiments illustrate variations of paired sets of adjacent tubes 62 with common aisle widths 102, it is recognized that these widths will vary under varying operating conditions, such as rate of ice build up or melt out on individual coils 68 and 76 or tubes 62. Further, the specific widths may be a design choice or driven by a specification from an application for thermal storage, but the ordering and arrangement is generally applicable to such structures.

Figure 8:
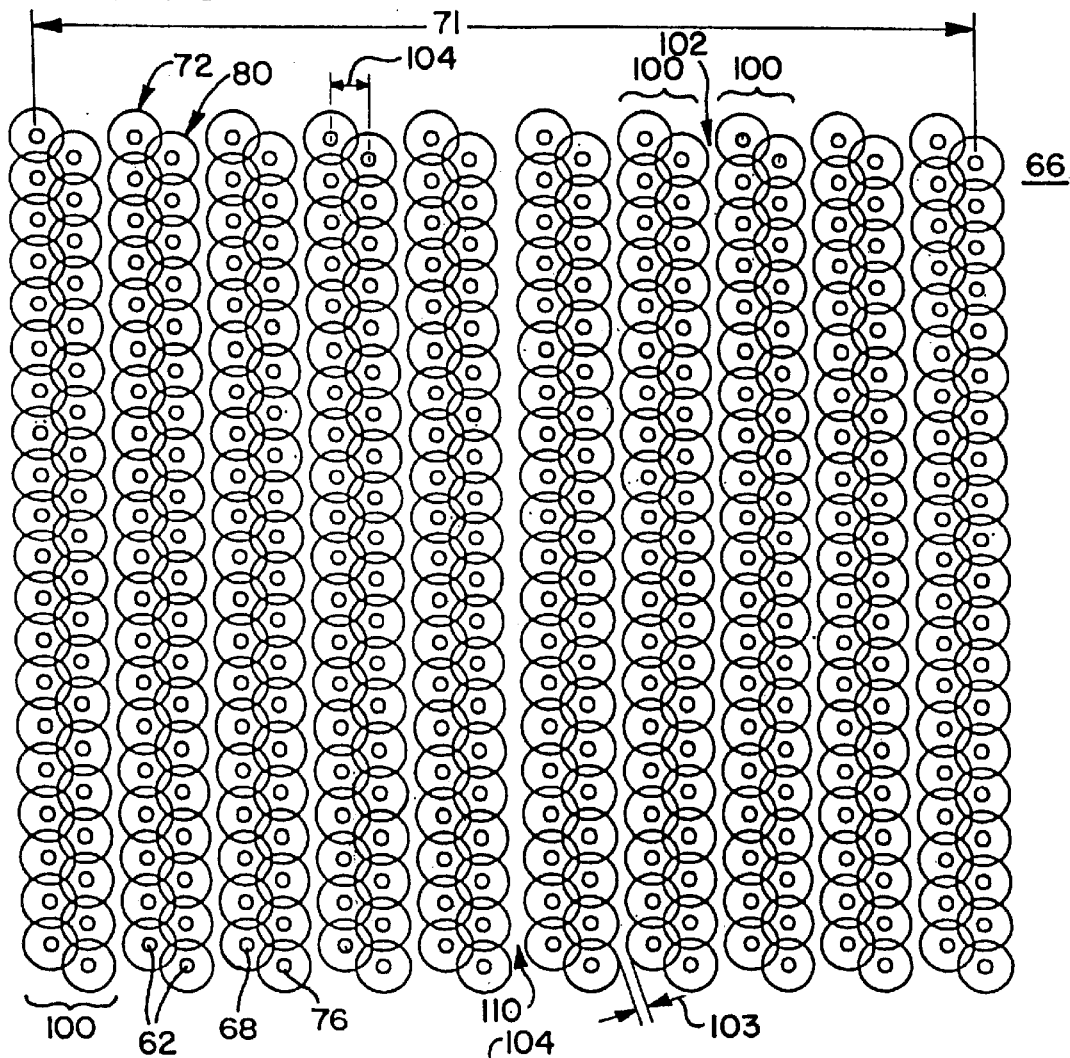
FIG. 8 illustrates an alternative embodiment of the structure in FIG. 4 wherein first separation is nominally equal between adjacent pairs of tubes, the second separation gap between adjacent pairs of coils is measurably more narrow and a. third separation gap with a significant width is centrally provided between the center pairs of adjacent coils.
Figure 8A:
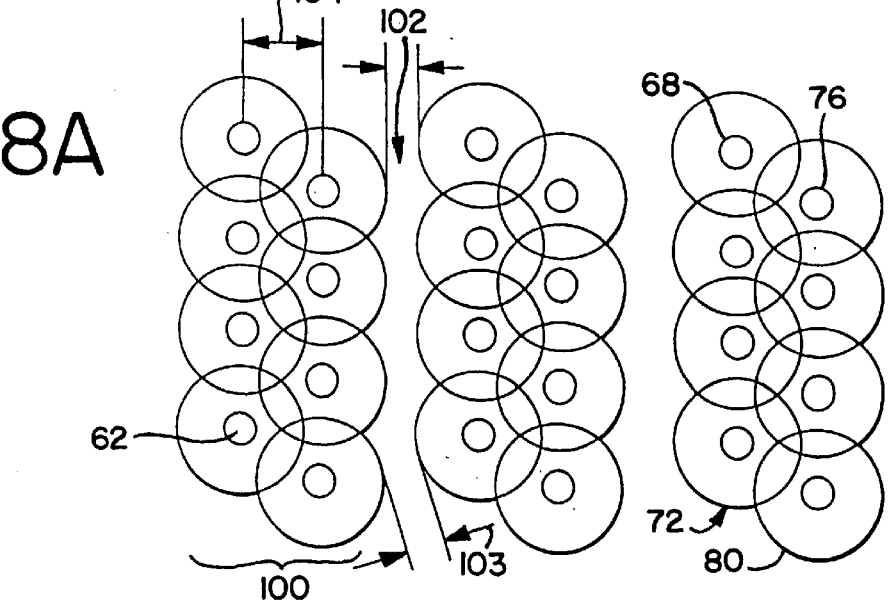
FIG. 8A is an enlarged 4×6 section of the coil and ice build-up structure in FIG. 8, and including the enlarged center separation gap.

FIGS. 8 and 8A illustrate an embodiment wherein adjacent tubes 62 in pairs 100, as noted above, are more closely aligned to provide a more narrow dimension for aisle or gap 104. Further, separation width 103 is also made more narrow to generally decrease the widths of aisles 102. However, the decrease in aisle widths 102 and 104 are accommodated by provision of central and enlarged aisle 110 with a width approximately twice width 103. This enlarged aisle 110 will provide fluid flow through array 66 even in an extreme overbuild condition when fluid flow is inhibited or restricted through aisles 102. This structure would allow fluid to contact more of the ice surface area to maintain a lower fluid temperature than with a monolithic ice mass. This flow rate will continue to maintain the desired fluid temperature below 34° F. and increase the melt-out rate of such monolithic masses to reopen aisles 102 to fluid and air flow.

Figure 9:
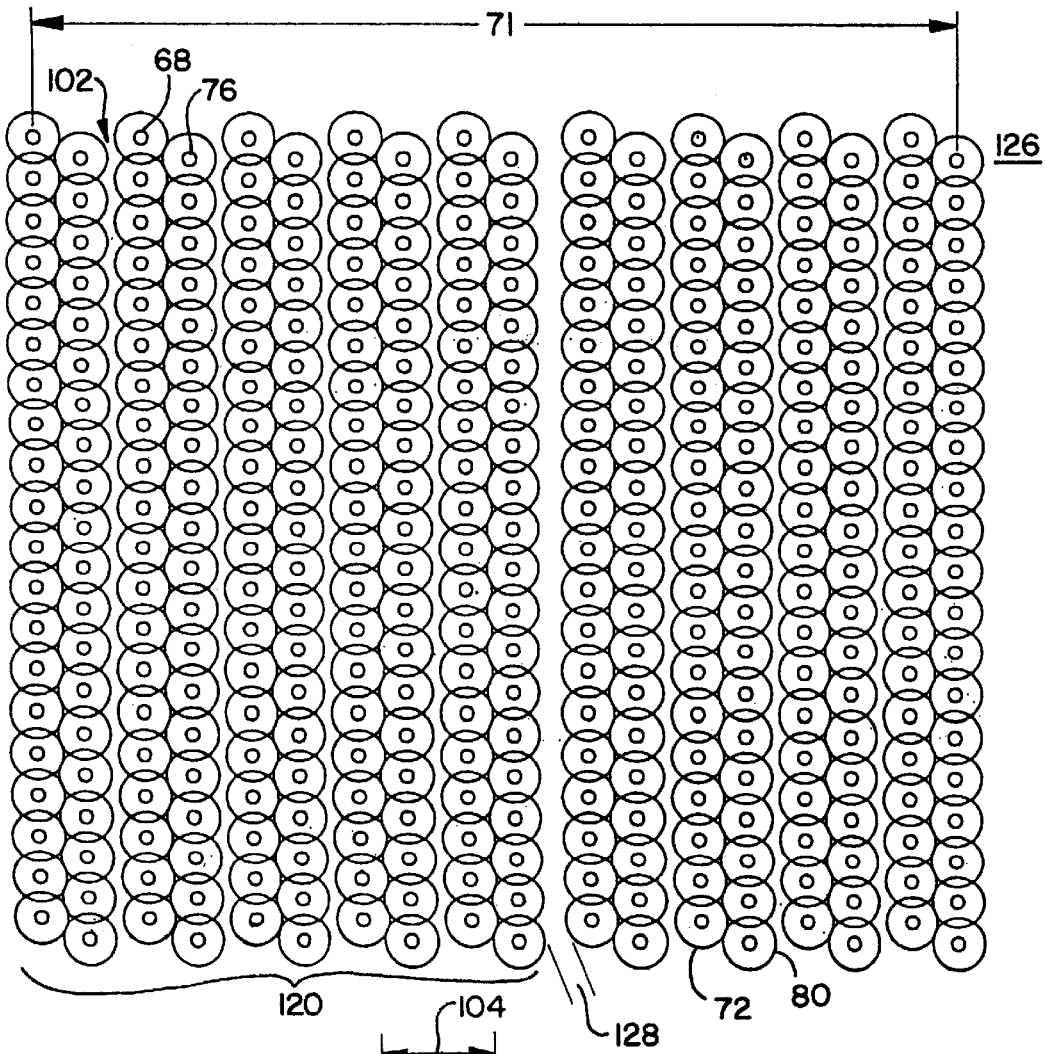
FIG. 9 illustrates an alternative embodiment of the structure of FIG. 8 wherein the first separation gap distance is significantly enlarged relative to the structure of FIG. 8, and o the second separation gap is reduced while the enlarged center separation gap is about the same width.
Figure 9A:
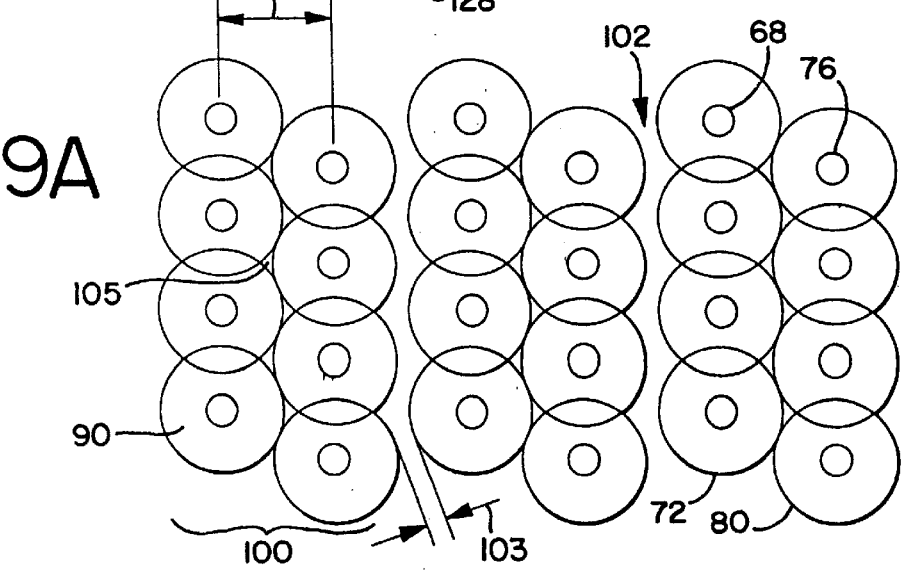
FIG. 9A is an enlarged 4×6 section of the coil and ice build-up structure in FIG. 9, but does not include the enlarged center separation gap.

FIGS. 9 and 9A show a structural array 66 generally similar to array 66 of FIG. 8. In this structure, aisle 104 between tubes 62 of each pair 100 is increased by about thirty percent. The increase again results in voids 105 at design full-capacity between ice cylinders 90. However, there is a reduction in the width of aisles 102 by about seventeen percent, and a reduction in separation width 103 of about fourteen percent. The reductions are again reflected by maintaining aisle width 110 approximately equal in both embodiments to continuously provide fluid flow access through array 66. Although only two-circuit pairs 100 are described, which have only two adjacent circuits 68, 76 per pair 100, it is considered that pairs 100 may have 3 or more closely adjacent circuits 68,76 in each grouping 100. The use of the illustration of only two circuits was for ease of illustration and understanding not as a limitation to the number of utilized circuits 68, 76.

In a third illustration akin to FIG. 8, multiple sets 120 of tubes 62 of coils 68 and 76 are provided in close proximity to each other in FIGS. 10 and 10A. In each set 120 narrow aisles 122, similar to aisle 88 in FIG. 3, are provided between adjacent tubes 62 or ice cylinders 90. Narrow aisles 122 are, for example, about thirty percent more narrow than aisles 88, although aisle width 104 between adjacent tube centers is only about three percent. The illustrated sets 120 in FIG. 10 have six vertical columns of tubes 62 and coils 68 and 76. The three sets 120 in array 126 are provided with wide corridors 128 between adjacent sets 120, which aisles 128 for comparative purposes are only about thirty-five percent more narrow than central wide aisle 110 in FIG. 8. This structure is accommodating to both an overbuild condition and provides more ice surface contact area for heat transfer than the prior art devices in such overbuilt state. It can be seen that there is a reduction in the total number of tubes 62, but it is an equivalent number to the prior art with enhanced aisle widths and safety or wide widths to accommodate ice overbuild with adequate provision for fluid flow. Even at an ice overbuild, voids 105 appear between adjacent tubes 62 in arrangement 120.

FIGS. 11 and 11A illustrate an embodiment accommodating plural sets of paired tubes 62. That is, tube pairs 100 as noted above with aisles 102 therebetween are closely paired with adjacent tube pairs 100 to provide plural tube arrangement 120. These plural tube arrangements 120 have wide aisles 128 between adjacent arrangements 120. In this configuration of array 126, aisle width 102 and width 103 are about equal to aisle width 102 and width 103 of the structure of FIG. 8. However, by more closely assembling pairs 100, added tubes 62 are provided to array 126, although it is recognized that ice cylinders 90 of adjacent tubes 62 of coils 68 and 76 will be more prone to bridging. The resultant design full-capacity structure still provides a plurality of aisles 102 and 128 for fluid flow, which aisle 128 again provides a safety margin against fluid flow inhibition at an ice overbuild condition.

In FIG. 14, two pairs of adjacent circuits 68 and 76 have dividers 130 nested between them, which dividers 130 provide widened or enlarged separation gaps 132. These gaps 132 are considered adequate to provide fluid flow through circuits 68, 76 to accommodate acceptable water outlet temperature. Dividers or inserts 130 are typically of a material with a low thermal conductivity to inhibit ice bridging across such dividers 130.

FIG. 15 illustrates the insertion of spacers 140 in as-built coils with separation of at least one pair of adjacent coils 68 and 76 by spacers 140, which are low conductivity materials such as plastic. Alternatively hollow spacers or perforated spacers may be used to maintain the enlarged separation gap. In addition, hollow spacers 140 could be used as air conduits to conduct air to coil bottom 97 for more vigorous agitation of fluid. This latter use of spacers is considered to be particularly beneficial in the assembly of galvanized steel tubing.

In FIG. 1, the illustrated control circuit would allow measurement of the inlet suction pressure or inlet fluid temperature as measure of a change in the ice build status within the arrays 66 and 126. In FIG. 13, the change in suction temperature at full-capacity of ice build decreases dramatically with the present invention, which provides a parameter for sensing by sensor 46. Such sensed signal can be provided to control device 50 to stop further ice build up and to maintain the aisle passages 102.

While only specific embodiments of the present invention have been shown and described, it is clear that this is not a limitation to the scope of the invention described herein.

We claim:

1. A coil assembly for communication of a heat-transfer fluid to a thermal storage unit having a housing with a fluid storage chamber, thermal-storage fluid in said chamber, means for coupling said thermal storage unit and thermal-storage fluid in said chamber to an externa apparatus for recovery of said stored thermal energy, means for transferring heat for said heat-transfer fluid, and means for connecting said heat-transfer means to said coil assembly, said coil assembly comprising:

a plurality of heat-transfer tubes, each said tube having a longitudinal axis, said tubes coupled to said heat transfer means by said connecting means for the communication of said heat-transfer fluid through said tubes;

said heat-transfer tubes arranged in a planned array in said chamber for the communication of said heat-transfer fluid through said chamber to reduce the temperature of said thermal-storage fluid and for the storage of thermal energy;

said planned array of tubes arranged in a plurality of generally adjacent horizontal rows and vertical columns, said array having a cross-sectional width and a height transverse to said longitudinal axis, said adjacent rows and columns of tubes cooperating to define generally first vertical aisles and horizontal aisles between said adjacent rows and columns of tubes across said width of said arrangement, said adjacent columns of said tubes cooperating to define at least one first horizontal separation gap distance between said tube axes of adjacent vertical columns of said tubes in said array cross-section, and said adjacent rows having at least one vertical separation gap distance;

said thermal-storage fluid having a first fluid temperature;

said heat-transfer fluid communicating through said tubes operable to reduce said first temperature of said thermal-storage fluid to a second temperature to solidify at least a portion of said thermal-storage fluid on each said tube;

at least one pair of said adjacent columns of said tubes having a second horizontal separation gap distance between the axes of said one pair of adjacent tubes greater than said first separation gap distance, said at least one pair of tubes in columns cooperating to define a second vertical aisle wider than said first vertical aisle to provide at least one passage for vertical thermal-storage fluid flow between said at least one pair of columns of adjacent tubes in said array at bridging between solidified thermal-storage fluid across said horizontal first separation gap distance of said vertical columns of tubes.

2. A coil assembly for communication of a heat-transfer fluid to a thermal storage unit as claimed in claim 1, said having a housing with a fluid storage chamber, thermal-storage fluid in said chamber, wherein said vertical columns of said tubes in said array are arranged in sets with at least two vertical columns of said tubes in each said set, each said set having a third separation gap distance between the axes of adjacent vertical columns of tubes in said set, said array having at least two of said sets of vertical columns of tubes, adjacent sets of said at least two sets of vertical columns of tubes having an adjacent vertical columns of tubes in proximity to said adjacent set of tubes, said proximate columns of tubes of said adjacent sets cooperating to define a fourth separation gap distance between the axes of said proximate adjacent columns of said different sets of tubes, said fourth separation gap distance greater than said third separation gap distance.

3. A coil assembly for communication of a heat-transfer fluid to a thermal storage unit as claimed in claim 2, wherein said second separation gap distance and said fourth separation gap distance are about equal.

4. A coil assembly for communication of a heat-transfer fluid to a thermal storage unit as claimed in claim 2, wherein said first separation gap distance and said third separation gap distance are about equal.

5. A coil assembly for communication of a heat-transfer fluid to a thermal storage unit as claimed in claim 2 wherein said sets of vertical columns of tubes are operable to provide segmented blocks of ice and said fourth separation gap incorporates a vertical aisle at bridging of solidified thermal storage fluid between said adjacent vertical columns of tubes in each said set.

6. A coil assembly for communication of a heat-transfer fluid to a thermal storage unit as claimed in claim 2 wherein each said set has a first vertical column and a second vertical column of tubes, each said set having said third separation-gap distance between each said first and second vertical column of each said set;
    said fourth separation-gap distance provided between adjacent sets of tubes across said width of said array.

7. A coil assembly for communication of a heat-transfer fluid to a thermal storage unit as claimed in claim 1 further comprising at least one header;
    each said tube in said chamber having a first end and a second end, at least one of said first and second ends coupled to said at least one header;
    said header having an inlet port and an outlet port coupled to means for heat transfer by said connecting means,
    said header operable to communicate said heat-transfer fluid to said array of tubes.

8. A coil assembly for communication of a heat-transfer fluid to a thermal storage unit as claimed in claim 1 wherein said means for transferring heat is a refrigeration unit having a compressor with a discharge port providing refrigerant for said array of tubes to reduce said thermal storage fluid temperature, and an inlet port to receive said refrigerant from said array of tubes at a second and reduced suction pressure.

9. A coil assembly for communication of a heat-transfer fluid to a thermal storage unit as claimed in claim 2 wherein said array has a plurality of vertical columns of tubes, said vertical columns provided in three sets of vertical tubes,
    said fourth separation-gap distance approximately twenty-five percent greater than said third separation-gap distance.

10. A coil assembly for communication of a heat-transfer fluid to a thermal storage unit as claimed in claim 1 wherein said array of tubes is a two-circuit array having a first fluid-flow circuit and a second fluid-flow circuit,
    said tubes of said array arranged in alternating alignment of said first circuit and second circuit in at least said vertical columns,
    said tubes in said array having generally parallel axes;
    said heat-transfer fluid in said first coil circuit flowing in a first and forward direction,
    said heat-transfer fluid in said second coil circuit flowing in a second direction opposite said first direction, said opposite flow direction in said adjacent tubes providing a more generally uniform solidification of said fluid on said tubes in said flow directions to provide a more uniform solidified thermal-storage fluid on said tubes in said chamber.

11. A coil assembly for communication of a heat-transfer fluid to a thermal storage unit as claimed in claim 1 wherein each said tube in said planned array has a cross-sectional diameter of about one inch,
    each said vertical column of said tube longitudinal axes defining a reference plane,
    said adjacent planes of said adjacent columns of each said pair of columns cooperating to define said first separation gap between said adjacent first and second reference planes,
    said first separation gap between said adjacent columns being at least two and eight-tenths inches between said adjacent pairs of columns;
    said second separation gap provided between said adjacent pairs of said vertical columns, each said pair of columns having one of said pair of vertical planes in proximity to one of said pair of vertical planes of an adjacent pair of vertical planes, said proximate planes cooperating to define said second gap distance;
    said second gap distance being at least ten percent greater in width than said first gap.

12. A coil assembly for communication of a heat-transfer fluid to a thermal storage unit as claimed in claim 11 wherein said second gap distance may extend over a range between about five percent and fifty percent greater than said first gap,
    said first gap extending between a range of said two and eight tenth inches and four and two tenths inches.

13. A coil assembly for communication of a heat-transfer fluid to a thermal storage unit as claimed in claim 6 wherein each said set has a first vertical column and a second vertical column of tubes, each said set having said third separation-gap distance between each said first and second vertical column of each said set;
    said fourth separation-gap distance provided between adjacent sets of tubes across said width of said array;
    each said tube in said planned array having a cross-sectional diameter of about one inch,
    each said vertical column of said tube longitudinal axes defining a reference plane,
    said adjacent planes of said adjacent columns of each said pair of columns cooperating to define said first separation gap between said adjacent first and second reference planes,
    said first separation gap between said adjacent columns being at least two and eight-tenths inches between said adjacent pairs of columns;
    said second separation gap provided between said adjacent pairs of said vertical columns, each said pair of columns having one of said pair of vertical planes in proximity to one of said pair of vertical planes of an adjacent pair of vertical planes, said proximate planes cooperating to define said second gap distance;
    said second gap distance being at least ten percent greater in width than said first gap.

14. A coil assembly for communication of a heat-transfer fluid to a thermal storage unit as claimed in claim 13 wherein each said third separation gap is equivalent to said second separation gap distance,
    said second separation gap distance may extend over a range between about five percent and fifty percent greater than said first gap distance,
    said first gap extending between a range of said two and eight tenth inches and four and two tenths inches, said fourth separation gap extends over a range of about ten percent and one hundred percent greater than said second separation gap distance.

15. A coil assembly for communication of a heat-transfer fluid to a thermal storage unit as claimed in claim 1, and further comprising a cooling and refrigeration circuit;

said refrigeration circuit having means for cooling a heat transfer fluid, means for connecting said refrigeration circuit to said thermal storage tank and coil array for transfer of heat-transfer fluid to said tank to chill said thermal storage fluid and to return said heat-transfer fluid to said refrigeration circuit, means for controlling said refrigeration circuit, means for sensing temperature and suction pressure of said heat transfer fluid returning to said refrigeration circuit, means for coupling said sensing means to said controlling means to control said refrigeration circuit and heat transfer fluid communication to said tank.

16. A coil assembly as claimed in claim 15 wherein said sensing means and controlling means are operable to cease heat transfer fluid flow to said coils at a predetermined change in one of said heat-transfer fluid temperature and line suction pressure to avoid further solidification of said thermal-storage fluid for preservation of at least said second separation-gap aisles for fluid flow and heat transfer within said array.

* * * * *